United States Patent
Nakajima et al.

(10) Patent No.: US 11,041,649 B2
(45) Date of Patent: Jun. 22, 2021

(54) AIR-CONDITIONING CONTROL DEVICE AND AIR-CONDITIONING CONTROL METHOD

(71) Applicant: Mitsubishi Electric Corporation, Chiyoda-ku (JP)

(72) Inventors: Osamu Nakajima, Chiyoda-ku (JP); Mio Motodani, Chiyoda-ku (JP); Masae Sawada, Chiyoda-ku (JP); Ryuta Tanaka, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 264 days.

(21) Appl. No.: 16/331,052

(22) PCT Filed: Jul. 28, 2017

(86) PCT No.: PCT/JP2017/027502
§ 371 (c)(1),
(2) Date: Mar. 6, 2019

(87) PCT Pub. No.: WO2018/092357
PCT Pub. Date: May 24, 2018

(65) Prior Publication Data
US 2020/0271346 A1    Aug. 27, 2020

(30) Foreign Application Priority Data

Nov. 16, 2016   (JP) .............................. JP2016-223131

(51) Int. Cl.
*F24F 11/46*     (2018.01)
*F24F 11/52*     (2018.01)
(Continued)

(52) U.S. Cl.
CPC .............. *F24F 11/46* (2018.01); *F24F 11/52* (2018.01); *G05B 13/026* (2013.01);
(Continued)

(58) Field of Classification Search
None
See application file for complete search history.

(56) References Cited

U.S. PATENT DOCUMENTS

| 5,927,087 A | * | 7/1999 | Ishikawa | ................. F25B 41/20 62/174 |
| 6,070,110 A | * | 5/2000 | Shah | .................... F24F 11/0008 700/278 |

(Continued)

FOREIGN PATENT DOCUMENTS

| JP | H10-259944 A | * | 9/1998 | ................ F24F 5/00 |
| JP | 2002-22245 A |   | 1/2002 |   |

(Continued)

OTHER PUBLICATIONS

Zhang et al., "Indoor humidity behaviors associated with decoupled cooling in hot and humid climates", Dec. 2001, Building and Environment 38 (2003) 99-107. (Year: 2001).*

(Continued)

*Primary Examiner* — Mohammad Ali
*Assistant Examiner* — Kelvin Booker
(74) *Attorney, Agent, or Firm* — Xsensus LLP

(57) ABSTRACT

Change of a set room temperature of an air-conditioning apparatus leads to change of electric power consumed by the air-conditioning apparatus, and in a case of cooling, the consumed electric power increases as the set room temperature decreases. Consequently, a user has been unable to freely change the set room temperature. Thus, when the set room temperature is changed by the user, an evaporating temperature (refrigerant temperature) at which the electric power consumed by the air-conditioning apparatus does not change before and after the change is estimated and the air-conditioning apparatus is commanded for the evaporating temperature, which allows the user to pursue indoor (Continued)

comfort without worrying about the electric power consumed by the air-conditioning apparatus.

9 Claims, 15 Drawing Sheets

(51) Int. Cl.
*G05B 13/02* (2006.01)
*F24F 110/20* (2018.01)
*F24F 140/60* (2018.01)
*F24F 140/20* (2018.01)

(52) U.S. Cl.
CPC ....... *F24F 2110/20* (2018.01); *F24F 2140/20* (2018.01); *F24F 2140/60* (2018.01)

(56) References Cited

U.S. PATENT DOCUMENTS

| | | | | |
|---|---|---|---|---|
| 7,841,194 B2* | 11/2010 | Ishida | .................. | F25B 49/02 62/176.6 |
| 9,874,360 B2* | 1/2018 | Hamada | .................. | F24F 3/065 |
| 2004/0034484 A1* | 2/2004 | Solomita, Jr. | .............. | H02J 3/14 702/62 |
| 2012/0060532 A1* | 3/2012 | Shimoda | .................. | F24F 11/30 62/150 |
| 2012/0192588 A1* | 8/2012 | Yamashita | ............ | F25B 25/005 62/498 |
| 2016/0054018 A1* | 2/2016 | Motodani | ................ | F24F 11/56 700/276 |
| 2016/0109145 A1* | 4/2016 | Liu | .......................... | F24F 11/30 700/276 |
| 2017/0051959 A1* | 2/2017 | Horie | ........................ | F24F 11/89 |
| 2018/0128511 A1* | 5/2018 | Motodani | ................ | F24F 11/89 |
| 2018/0299157 A1* | 10/2018 | Jang | .......................... | F24F 1/32 |
| 2019/0017721 A1* | 1/2019 | Motodani | ................ | F24F 11/64 |
| 2020/0355379 A1* | 11/2020 | Kim | ...................... | F24F 5/0007 |

FOREIGN PATENT DOCUMENTS

| | | | | | |
|---|---|---|---|---|---|
| JP | | 2005-98607 A | * | 4/2005 | ............. F24F 11/02 |
| JP | | 4915387 B2 | * | 4/2012 | ............. F24F 11/02 |
| JP | | 2013-113533 A | | 6/2013 | |
| JP | | 2013-139923 A | | 7/2013 | |
| JP | | 2015-14407 A | | 1/2015 | |

OTHER PUBLICATIONS

Li et al., "The characteristics of space cooling load and indoor humidity control for residences in the subtropics", Nov. 2004, Building and Environment 41 (2006) 11 37 1147. (Year: 2004).*

Han et al., "Experimental study on a residential temperature-humidity separate control air-conditioner", Jul. 2010, Energy and Buildings 43 (2011 ) 3584-3591. (Year: 2010).*

International Search Report dated Oct. 3, 2017 in PCT/JP2017/027502 filed Jul. 28, 2017.

* cited by examiner

FIG. 5

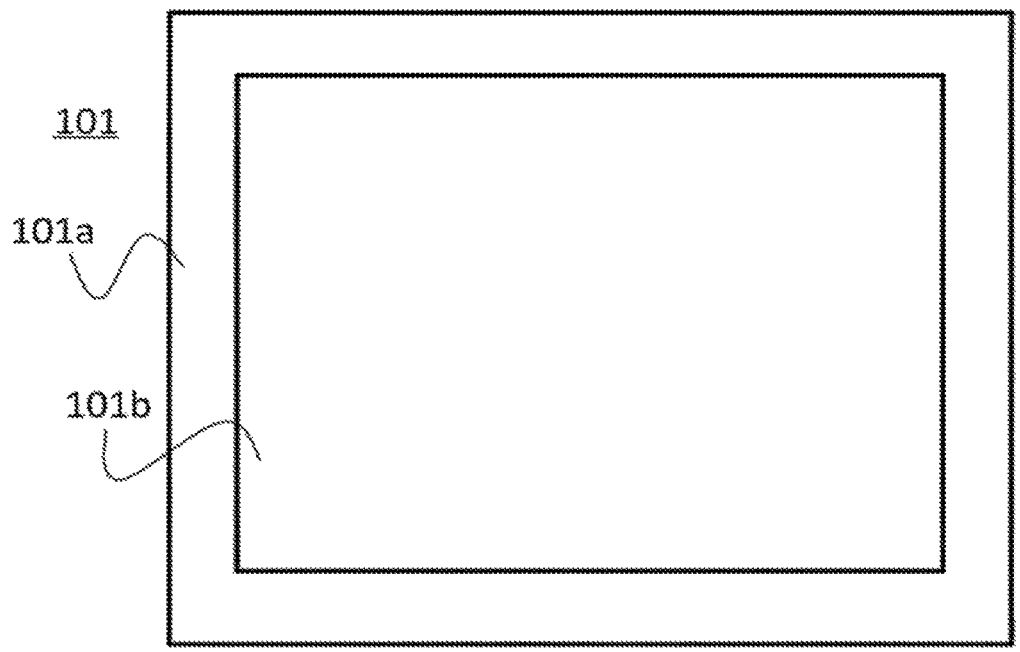

FIG. 6

| LOAD TYPE | | HEAT LOAD TYPE | | EXEMPLARY AIR-CONDITIONING ZONING CLASSIFICATION | | CHARACTERISTICS |
|---|---|---|---|---|---|---|
| | | COOLING | HEATING | PERIMETER | INTERIOR | |
| 1 | SOLAR HEAT LOAD | S | — | ✓ | — | COOLING THROUGHOUT YEAR |
| 2 | THROUGH-FLOW HEAT LOAD | S | S | ✓ | — | COOLING IN SUMMER HEATING IN WINTER |
| 3 | DRAFT LOAD | S+L | S+L | ✓ | — | COOLING IN SUMMER HEATING IN WINTER |
| 4 | HUMAN BODY LOAD | S+L | — | ✓ | ✓ | COOLING THROUGHOUT YEAR |
| 5 | ILLUMINATION LOAD | S | — | ✓ | ✓ | COOLING THROUGHOUT YEAR |
| 6 | INSTRUMENT LOAD | S+L | — | ✓ | ✓ | COOLING THROUGHOUT YEAR |
| 7 | OUTDOOR AIR LOAD | S+L | S+L | ✓ | ✓ | COOLING IN SUMMER, HEATING IN WINTER |
| REMARKS | | S: SENSIBLE HEAT LOAD  L: LATENT HEAT LOAD | | ✓: MAIN GENERATION PLACE | | |

FIG. 9

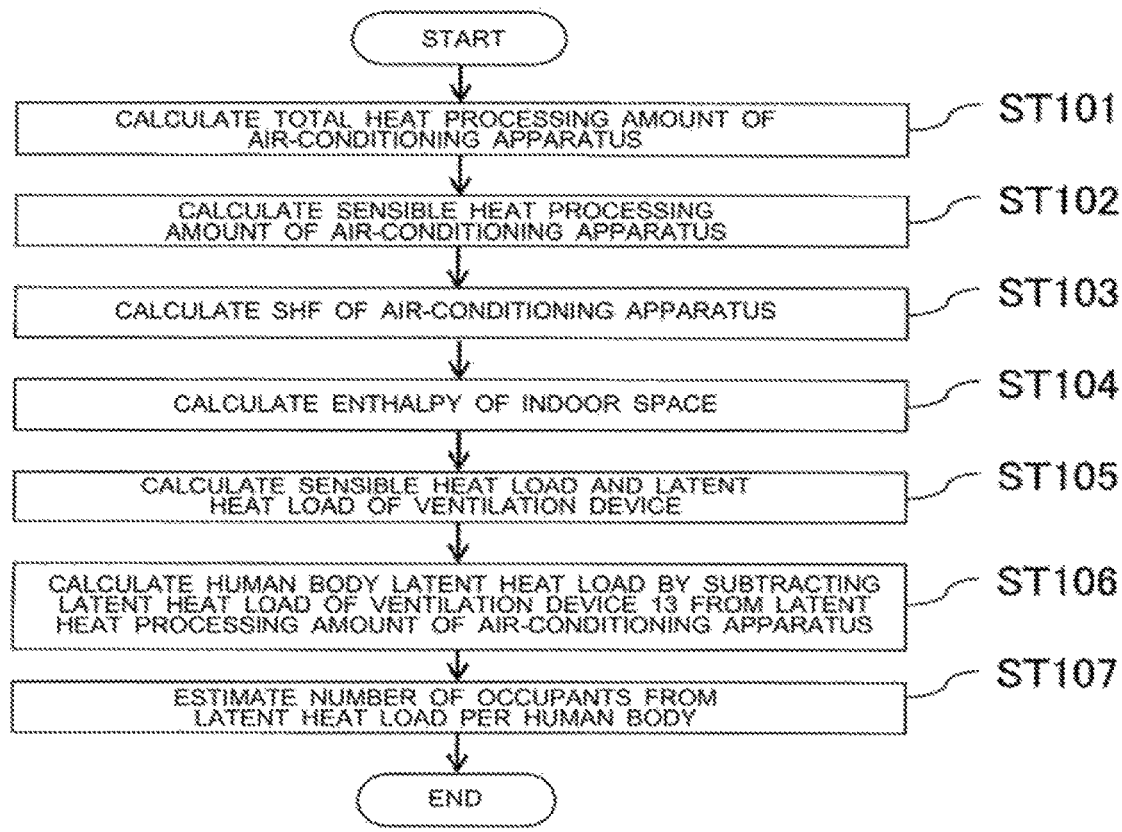

FIG. 10

| | EXAMPLE | TOTAL GENERATION HEAT AMOUNT (W/PERSON) | 22°C | | 24°C | | 26°C | | 28°C | |
|---|---|---|---|---|---|---|---|---|---|---|
| | | | SENSIBLE HEAT | LATENT HEAT | SENSIBLE HEAT | LATENT HEAT | SENSIBLE HEAT | LATENT HEAT | SENSIBLE HEAT | LATENT HEAT |
| SIT ON HEELS | THEATER | 98 | 77 | 23 | 73 | 24 | 64 | 34 | 51 | 47 |
| LIGHT WORK | SCHOOL | 116 | 88 | 28 | 80 | 36 | 67 | 49 | 55 | 62 |
| OFFICE WORK, SLOW WALK | OFFICE, HOTEL, DEPARTMENT STORE | 121 | 92 | 29 | 81 | 40 | 69 | 53 | 55 | 66 |
| STAND, SIT, WALK | BANK | 139 | 98 | 42 | 85 | 55 | 71 | 67 | 58 | 81 |
| SEDENTARY OCCUPATION | RESTAURANT | 146 | 105 | 41 | 92 | 55 | 79 | 67 | 65 | 81 |
| SEDENTARY WORK | LIGHT WORK AT FACTORY | 208 | 116 | 92 | 101 | 106 | 86 | 121 | 71 | 137 |
| NORMAL DANCE | DANCE HALL | 230 | 130 | 99 | 115 | 115 | 98 | 133 | 80 | 150 |
| WALK AT 4.3 km/h | HEAVY WORK AT FACTORY | 277 | 145 | 131 | 127 | 149 | 108 | 168 | 88 | 187 |
| BOWLING | BOWLING ALLEY | 400 | 175 | 224 | 151 | 249 | 126 | 274 | 101 | 299 |

AIR-CONDITIONING CONTROL DEVICE AND AIR-CONDITIONING CONTROL METHOD

TECHNICAL FIELD

The present invention relates to an air-conditioning control device and an air-conditioning control method of a heat pump air-conditioning apparatus.

BACKGROUND ART

In change of the set room temperature of a conventional air-conditioning system with an electric power plan taken into account, when a determination unit determines that electric power exceeds that on the plan as a result of the set room temperature change, the set room temperature is set with the set room temperature change restricted, and the air-conditioning system continues operation (for example, Patent Literature 1).

Meanwhile, in the control method of an air-conditioning system that reduces consumption energy while satisfying conventional set temperature and humidity, an outdoor air condition and an indoor condition are measured, a relation of the evaporating temperature, condensing temperature, and coefficient of performance (COP) of the air-conditioning apparatus in the air state is obtained, and the air-conditioning apparatus is operated by responding to load and using evaporating temperature and condensing temperature giving the maximum COP (for example, Patent Literature 2).

CITATION LIST

Patent Literature

Patent Literature 1: Japanese Unexamined Patent Application Publication No. 2015-014407
Patent Literature 2: Japanese Unexamined Patent Application Publication No. 2002-022245

SUMMARY OF INVENTION

Technical Problem

In such an air-conditioning system, when the set room temperature is decreased in a cooling operation and when the set room temperature is increased in a heating operation, the load processed by the air-conditioning apparatus increases, and the consumed electric power inevitably increases. Thus, when there is a change that does not follow a consumed electric power plan, the set room temperature change is not reflected, causing problems such as forcing a user of the air-conditioning apparatus to be patient, which results in impaired comfort.

The present invention is intended to solve the above-described problems and provide an air-conditioning control device and an air-conditioning control method of an air-conditioning apparatus that set a set room temperature desired by a user to the air-conditioning apparatus and operate the air-conditioning apparatus without increasing electric power consumed by the air-conditioning apparatus.

Solution to Problem

An air-conditioning control device according to one embodiment of the present invention is an air-conditioning control device including an indoor humidity estimation unit configured to estimate an indoor humidity and a latent heat load at a second set room temperature of an air-conditioning apparatus including a refrigeration cycle when a first set room temperature is changed to the second set room temperature and the indoor humidity estimation unit receives the second set room temperature and a refrigerant temperature as a parameter of the refrigeration cycle; a refrigeration cycle estimation unit configured to estimate consumed electric power at the second set room temperature when the refrigeration cycle estimation unit receives an outdoor air temperature, the refrigerant temperature, the indoor humidity, and the latent heat load; and a refrigerant temperature calculation unit configured to change the refrigerant temperature to cause the indoor humidity estimation unit to repeat an estimation of the indoor humidity and the latent heat load and the refrigeration cycle estimation unit to repeat an estimation of the consumed electric power and, when the consumed electric power at the second set room temperature estimated by the refrigeration cycle estimation unit equals electric power consumed by the air-conditioning apparatus at the first set room temperature, the refrigerant temperature calculation unit is configured to calculate the refrigerant temperature with which the consumed electric power at the second set room temperature is estimated and command the air-conditioning apparatus for the refrigerant temperature.

An air-conditioning control device according to another embodiment of the present invention is an air-conditioning control device including an indoor humidity estimation unit configured to estimate an indoor humidity and a latent heat load at a set candidate room temperature of an air-conditioning apparatus including a refrigeration cycle when the indoor humidity estimation unit receives the set candidate room temperature and a refrigerant temperature as a parameter of the refrigeration cycle; a refrigeration cycle estimation unit configured to estimate consumed electric power at the set candidate room temperature when the refrigeration cycle estimation unit receives an outdoor air temperature, the refrigerant temperature, the indoor humidity, and the latent heat load; a refrigerant temperature calculation unit configured to change the refrigerant temperature to cause the indoor humidity estimation unit to repeat an estimation of the indoor humidity and the latent heat load and the refrigeration cycle estimation unit to repeat an estimation of the consumed electric power and calculate the refrigerant temperature that equals the set candidate room temperature when the consumed electric power at the set candidate room temperature estimated by the refrigeration cycle estimation unit equals electric power consumed by the air-conditioning apparatus at a current set room temperature; and a set candidate accumulation display unit configured to accumulate the refrigerant temperature at the set candidate room temperature when the consumed electric power calculated by the refrigerant temperature calculation unit equals the electric power consumed by the air-conditioning apparatus at the current set room temperature, and display the set candidate room temperature when the consumed electric power calculated by the refrigerant temperature calculation unit equals the electric power consumed by the air-conditioning apparatus at the current set room temperature.

An air-conditioning control method according to still another embodiment of the present invention is an air-conditioning control method including an indoor humidity estimation step of estimating an indoor humidity and a latent heat load at a second set room temperature of an air-conditioning apparatus including a refrigeration cycle by changing a first set room temperature to the second set room temperature and inputting the second set room temperature and a refrigerant temperature as a parameter of the refrigeration cycle; a refrigeration cycle estimation step of estimating consumed electric power at the second set room temperature by inputting an outdoor air temperature, the refrigerant temperature, the indoor humidity, and the latent heat load; and a refrigerant temperature calculation step of changing the refrigerant temperature to cause the indoor humidity estimation step to repeat an estimation of the indoor humidity and the latent heat load and the refrigeration cycle estimation step to repeat an estimation of the consumed electric power, and when the consumed electric power at the second set room temperature estimated at the refrigeration cycle estimation step equals electric power consumed by the air-conditioning apparatus at the first set room temperature, calculating the refrigerant temperature with which the consumed electric power at the second set room temperature is estimated and commanding the air-conditioning apparatus for the refrigerant temperature.

An air-conditioning control method according to yet another embodiment of the present invention is an air-conditioning control method including an indoor humidity estimation step of estimating an indoor humidity and a latent heat load at a set candidate room temperature of an air-conditioning apparatus including a refrigeration cycle by inputting the set candidate room temperature and a refrigerant temperature as a parameter of the refrigeration cycle; a refrigeration cycle estimation step of estimating consumed electric power at the set candidate room temperature by inputting an outdoor air temperature, the refrigerant temperature, the indoor humidity, and the latent heat load; a refrigerant temperature calculation step of changing the refrigerant temperature to cause the indoor humidity estimation step to repeat an estimation of the indoor humidity and the latent heat load and the refrigeration cycle estimation step to repeat an estimation of the consumed electric power, and when the consumed electric power at the set candidate room temperature estimated at the refrigeration cycle estimation step equals electric power consumed by the air-conditioning apparatus at a current set room temperature, calculating the refrigerant temperature with which the consumed electric power at the set candidate room temperature is estimated that equals the set candidate room temperature; and a set candidate accumulation display step of accumulating the refrigerant temperature at the set candidate room temperature with which the consumed electric power is estimated when the consumed electric power calculated at the refrigerant temperature calculation step equals the electric power consumed by the air-conditioning apparatus at the current set room temperature, and displaying the set candidate room temperature when the consumed electric power at the set candidate room temperature calculated at the refrigerant temperature calculation step equals the electric power consumed by the air-conditioning apparatus at the current set room temperature.

Advantageous Effects of Invention

An air-conditioning control device and an air-conditioning control method according to an embodiment of the present invention can operate an air-conditioning system at a set room temperature desired by a user without changing electric power consumed by the air-conditioning system.

BRIEF DESCRIPTION OF DRAWINGS

FIG. 5 is a diagram illustrating indoor zone division according to Embodiment 1 of the present invention.

FIG. 6 is a diagram illustrating exemplary load types and zoning classifications according to Embodiment 1 of the present invention.

FIG. 9 is a flowchart of occupant number estimation according to Embodiment 1 of the present invention.

FIG. 10 is a diagram illustrating human body loads according to Embodiment 1 of the present invention.

DESCRIPTION OF EMBODIMENTS

Embodiment 1

Figure 1:
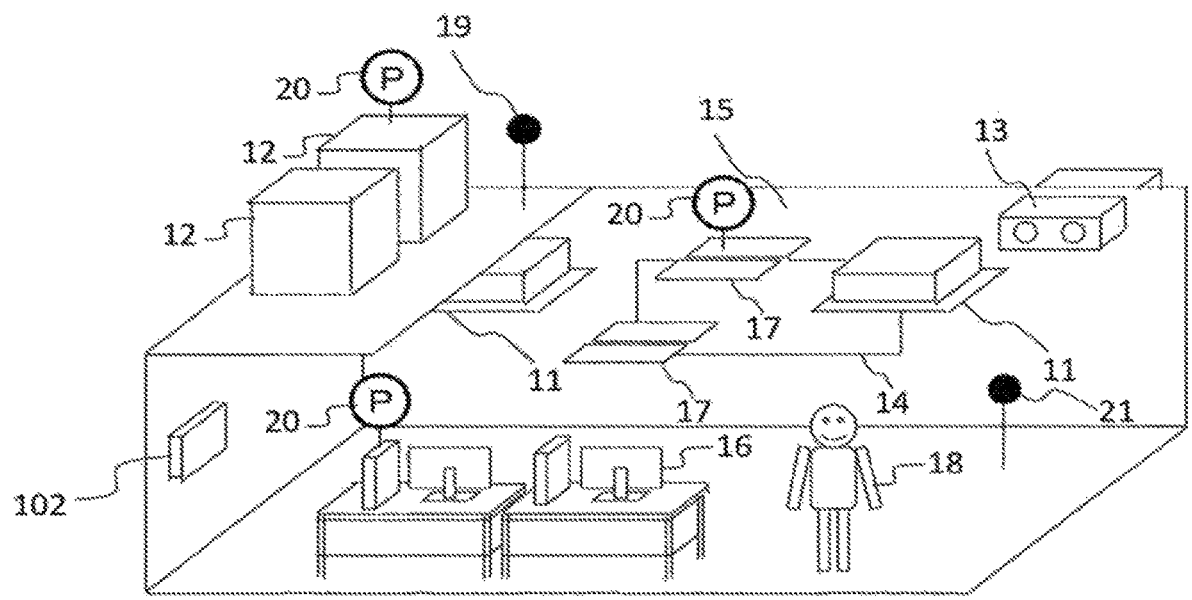
FIG. 1 is a schematic view illustrating a space in which an air-conditioning system according to Embodiment 1 of the present invention is installed.

FIG. 1 is a schematic view illustrating a space in which an air-conditioning system according to Embodiment 1 of the present invention is installed. FIG. 1 illustrates main devices of the air-conditioning system, such as an indoor unit 11, an outdoor unit 12, a ventilation device 13, and an air-conditioning control device 102. Typically, the ventilation device 13 is introduced to an air-conditioning system intended for people, but the embodiment of the present invention is applicable to a configuration not including the ventilation device 13. The indoor unit 11 may be of any type such as a ceiling-embedded type, a ceiling-suspended type, a wall-mounted type, and a floor-mounted type. The outdoor unit 12 may be installed on a roof as illustrated in FIG. 1 or may be installed on, for example, a balcony outside of a vertical wall 15.

The indoor unit 11 and the outdoor unit 12 may be installed as separate housings and connected with each other through a pipe or may be installed as an identical housing through the wall 15 or a window 14. The ventilation device 13 is installed on the exterior of a ceiling or in the vicinity of a ceiling surface of the vertical wall 15, and supplies introduced outdoor air to the space. Introduced outdoor air may be directly supplied to the space through a place at which the ventilation device 13 is installed, or may be supplied to a room through an air outlet provided on a ceiling surface at each position in the room through a duct. The air outlet for introduced outdoor air may be the same as an air outlet of the indoor unit 11.

The space is provided with, in addition to the air-conditioning system, an environment for using the space as, for example, an office. The wall 15 includes the window 14 through which natural light is introduced to prevent closed impression. Desks are placed on the floor surface and an office automation apparatus 16 is installed on each desk, so that facilities for performing office work are provided. An illumination apparatus 17 is installed on the ceiling surface to provide illuminance at the hand of a worker as necessary. A person 18 exists in the space, performing office work. The space also includes an room occupancy sensor 21 configured to sense whether the person 18 is present in the space and further count the number of people in the room. In description of Embodiment 1, an office is used as an example, but a space to which the present technology is applied is not limited to an office. For example, the present technology is applicable to a school, a hospital, or a commercial facility.

The air-conditioning system can be controlled by using the air-conditioning control device 102, and the person 18 can cause, as necessary, the air-conditioning system to execute a command for a set room temperature in addition to activation and stop of the air-conditioning system through the air-conditioning control device 102. In addition, sensors for determining the outdoor air temperature and humidity and the use status of the space are installed. A temperature and humidity sensor 19 configured to measure the temperature and humidity of outdoor air is installed on the roof.

An electric power meter 20 is installed on each of the outdoor unit 12, the office automation apparatus 16, and the illumination apparatus 17 to be able to measure the electric power consumed by each instrument. The electric power meter 20 may be any device capable of obtaining the electric power consumed by each instrument. For example, in a case of an air-conditioning apparatus, electric power may be estimated and output by using a measured value of a sensor included in the air-conditioning apparatus in advance to control the air-conditioning apparatus. The electric power consumed by the office automation apparatus 16 and the illumination apparatus 17 does not need to be separately measured, but their sum may be measured. For example, the sum of the electric power consumed by both instruments may be measured by a power distribution board.

Figure 2:
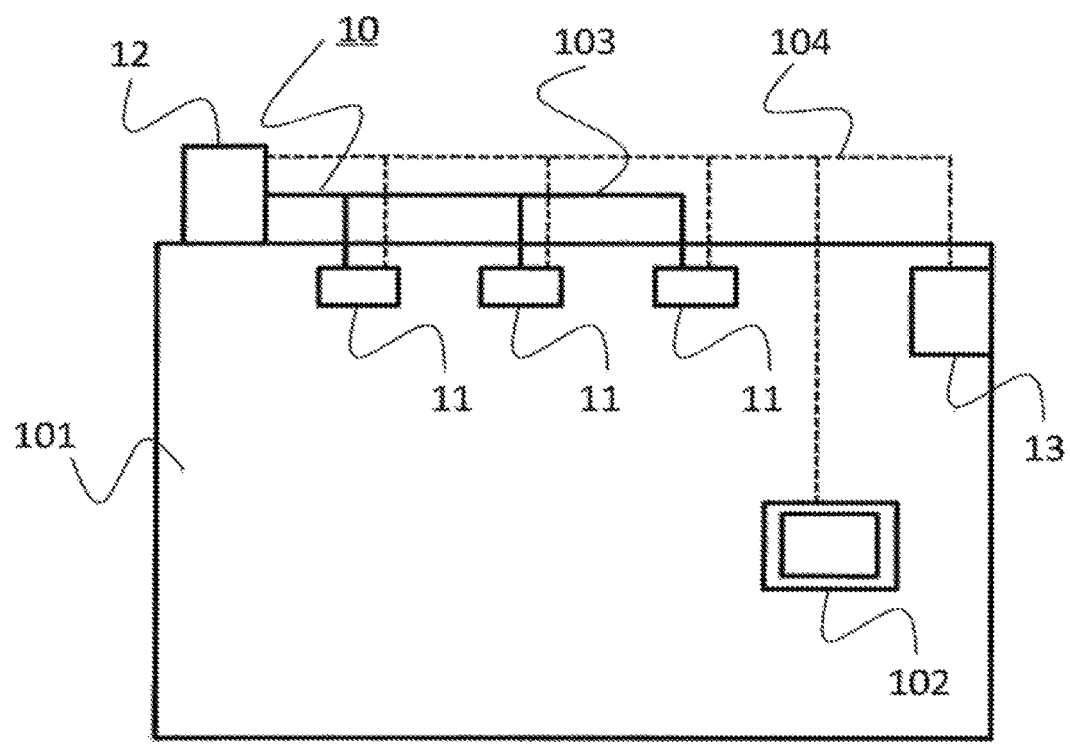
FIG. 2 is a schematic diagram of the air-conditioning system according to Embodiment 1 of the present invention.

FIG. 2 is a schematic diagram of the air-conditioning system according to Embodiment 1 of the present invention. The air-conditioning system includes, for example, an air-conditioning apparatus 10, the ventilation device 13, and the air-conditioning control device 102. In the example illustrated in FIG. 2, the air-conditioning apparatus 10 includes three indoor units 11 and one outdoor unit 12. Each indoor unit 11 is installed at an indoor place, and the outdoor unit 12 is installed at an outdoor place.

The outdoor unit 12 can exchange refrigerant with the indoor unit 11 through a refrigerant pipe 103. The ventilation device 13 can acquire outdoor air to the inside of the room and discharge indoor air to the outside of the room, but is not essential for implementing the present invention. The air-conditioning control device 102 allows a user of the air-conditioning system to input a set room temperature.

The indoor unit 11, the outdoor unit 12, the ventilation device 13, and the air-conditioning control device 102 are connected with each other through a transmission line 104 illustrated with dotted lines. The air-conditioning control device 102 can collect and record measured values of sensors at the indoor unit 11, the outdoor unit 12, and the ventilation device 13 and operation data of activation and stop to a storage serving as a storage medium through the transmission line 104. The transmission line 104 can transmit a control command provided from the air-conditioning control device 102 to the indoor unit 11 and the outdoor unit 12.

When the user inputs a set room temperature to the air-conditioning control device 102 and the air-conditioning system starts operation, the air-conditioning apparatus 10 performs operation so that the indoor temperature approaches the set room temperature.

Figure 3:
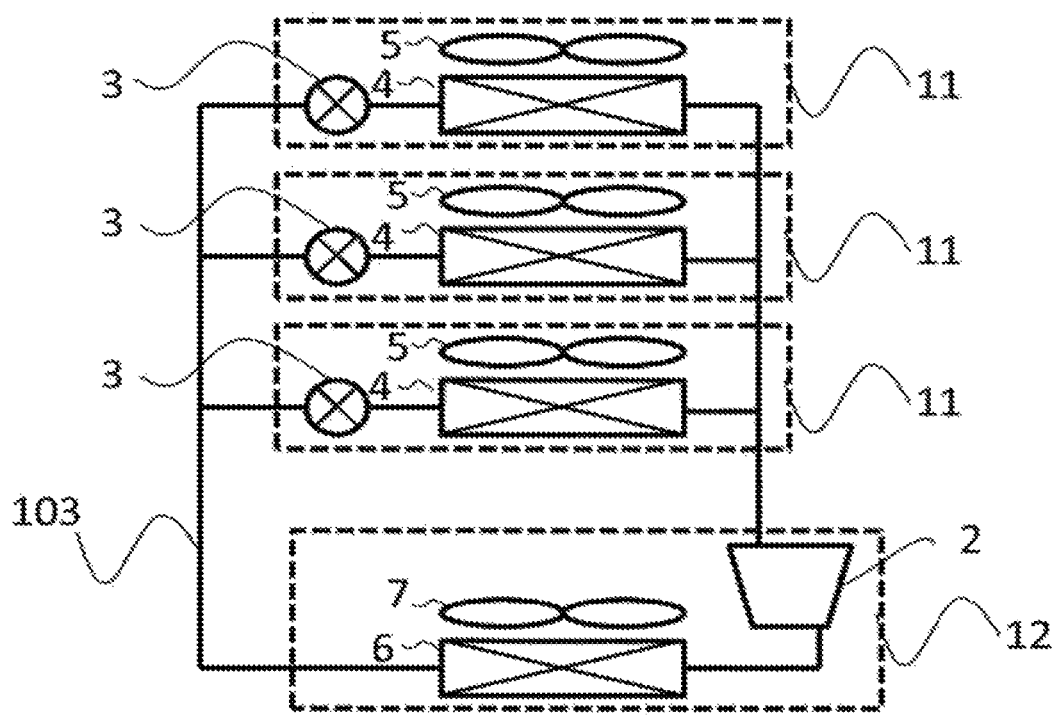
FIG. 3 is a schematic diagram of a refrigerant circuit of an air-conditioning apparatus according to Embodiment 1 of the present invention.

FIG. 3 is a schematic diagram of a refrigerant circuit of the air-conditioning apparatus 10 according to Embodiment 1 of the present invention. The air-conditioning apparatus 10 includes a compressor 2, an expansion valve 3, an indoor heat exchanger 4, and an outdoor heat exchanger 6, which are connected with each other through the refrigerant pipe 103. The indoor heat exchanger 4 is provided with an indoor fan 5, and the outdoor heat exchanger 6 is provided with an outdoor fan 7. In operation of the air-conditioning apparatus 10, air is transferred to the heat exchangers, thereby increasing the efficiency of heat exchange.

The air-conditioning apparatus 10 is of a heat-pump type. At cooling, in the air-conditioning apparatus 10, refrigerant is compressed by the compressor 2, and the refrigerant in a high-temperature and high-pressure state flows into the outdoor heat exchanger 6 to exchange heat with outdoor air, so that the refrigerant temperature decreases. Subsequently, the refrigerant flows into the indoor unit 11 through the refrigerant pipe 103. The refrigerant having flowed into the indoor unit 11 is depressurized through the expansion valve 3, and the refrigerant in a low-temperature and low-pressure state flows into the indoor heat exchanger 4 to exchange heat with the indoor air, so that the refrigerant temperature increases. During this process, the indoor air is cooled through heat release to the refrigerant and returned into the room. The refrigerant is then returned to the compressor 2 again to repeat the above-described cycle, thereby cooling the inside of the room.

At cooling, in the air-conditioning apparatus 10, the refrigerant flows through the compressor 2, the outdoor heat exchanger 6, the expansion valve 3, and the indoor heat exchanger 4 in the stated order. However, a four-way valve may be provided on the refrigerant circuit so that the refrigerant flows to the compressor 2, the indoor heat exchanger 4, the expansion valve 3, and the outdoor heat exchanger 6 in the stated order, thereby performing heating.

Figure 4:
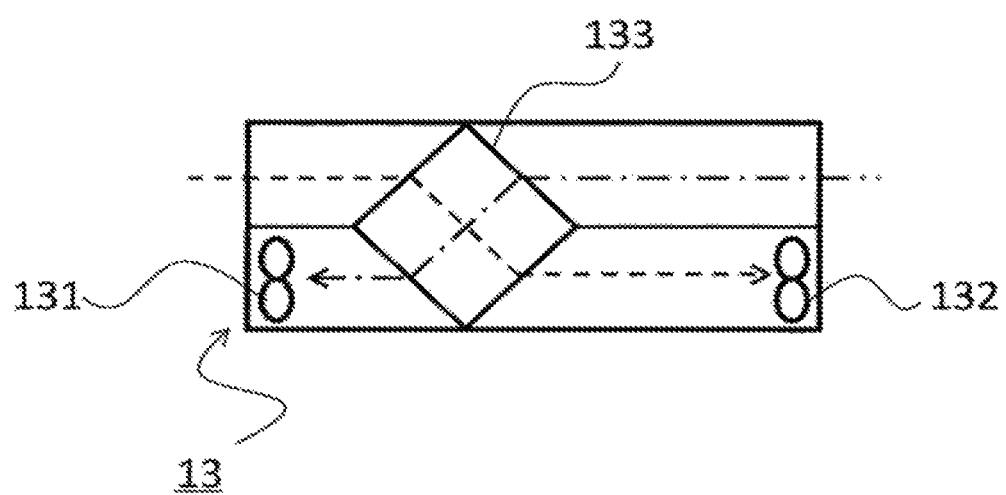
FIG. 4 is a schematic diagram of a ventilation device according to Embodiment 1 of the present invention.

FIG. 4 is a schematic diagram of the ventilation device 13 according to Embodiment 1 of the present invention. The ventilation device 13 includes an air supply fan 131 for introducing outdoor air to the inside of the room as illustrated with an arrow of a dashed and single-dotted line, an air discharge fan 132 for discharging indoor air to the outside of the room as illustrated with an arrow of a dotted line, and a total heat exchanger 133 for performing total heat exchange between outdoor air and indoor air. The ventilation device 13 may include an air filter and a humidification unit in addition to the total heat exchanger 133. In this case, the air filter and the humidification unit are included to achieve the heat exchange efficiency of the ventilation device 13.

FIG. 5 is a diagram illustrating indoor zone division according to Embodiment 1 of the present invention. More specifically, an indoor space 101 seen as a plane view of the inside of the room illustrated FIG. 2 when viewed from above is divided into a perimeter 101a that is largely affected by the outdoor space, and an interior 101b that is relatively unlikely to be affected by the outdoor space. Such division of the indoor space 101 is defined as zoning.

FIG. 6 is a diagram illustrating exemplary load types and zoning classifications according to Embodiment 1 of the present invention. The interior 101b mainly has heat loads such as a human body load, an illumination apparatus load, an instrument load, and an outdoor air load along with outdoor air introduction for ventilation. The perimeter 101a has, in addition to the heat loads processed by the interior 101b, heat loads to be processed such as a solar heat load, a through-flow heat load, and a draft load. This zoning shows that the perimeter 101a tends to have a heat load larger than that of the interior 101b.

In designing of the air-conditioning system, typically, the air-conditioning apparatus 10 at the perimeter 101a has a larger capacity than that of the air-conditioning apparatus 10 at the interior 101b so that a larger heat load is processed at the perimeter 101a than that at the interior 101b. The through-flow heat load, the solar heat load, and the draft load having entered from the outside of the room are processed by the air-conditioning apparatus 10 at the perimeter 101a.

In the present invention, a heat load currently processed by the air-conditioning apparatus 10 is estimated separately for latent heat and sensible heat for each load type by analyzing operation data of the air-conditioning apparatus 10 at the interior 101b by using such classification of the interior 101b and the perimeter 101a of the indoor space 101. Technologies of estimating the solar heat load, the through-flow heat load, and the draft load can be applied to a case of the perimeter 101a.

Figure 7:
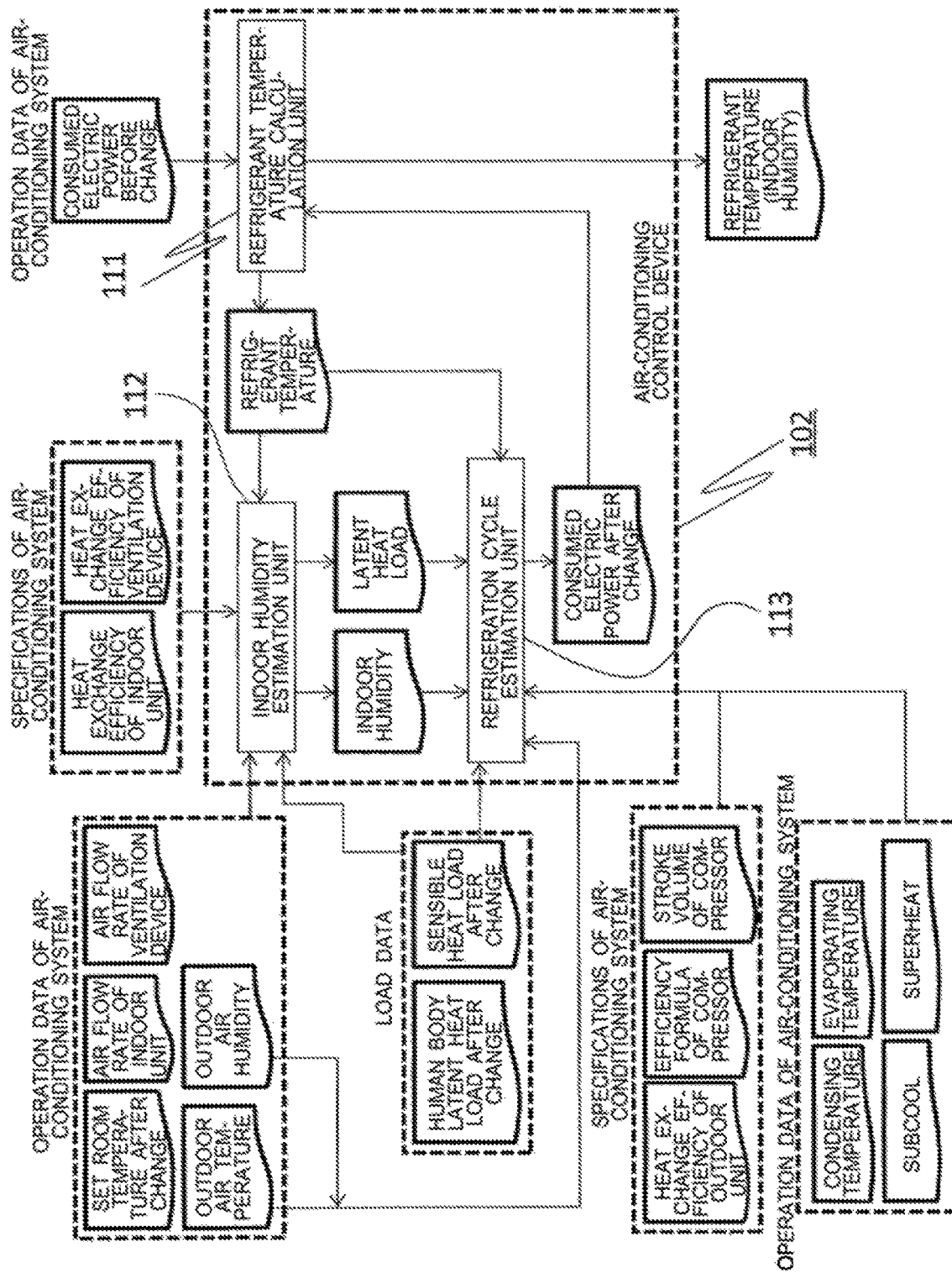
FIG. 7 is a configuration diagram of an air-conditioning control device according to Embodiment 1 of the present invention.
Figure 8:
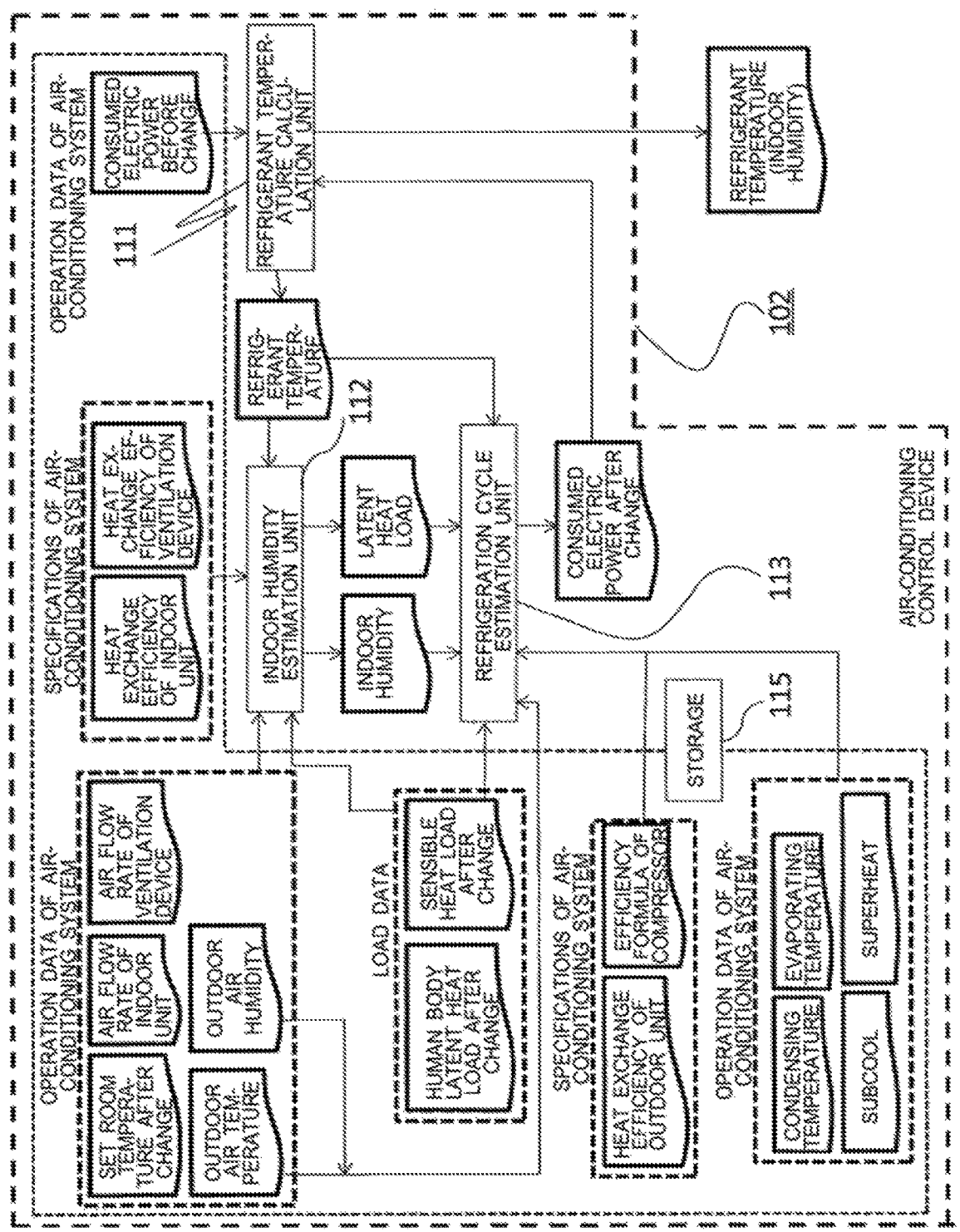
FIG. 8 is a configuration diagram of the air-conditioning control device according to Embodiment 1 of the present invention.

FIGS. 7 and 8 are each a configuration diagram of the air-conditioning control device 102 according to Embodiment 1 of the present invention. FIGS. 7 and 8 are different from each other in that a storage 115 serving as a storage medium is provided outside of the air-conditioning control device 102 in FIG. 7 but is provided outside of the air-conditioning control device 102 in FIG. 8. The air-conditioning control device 102 includes at least a refrigerant temperature calculation unit 111, an indoor humidity estimation unit 112, and a refrigeration cycle estimation unit 113.

The configuration diagram of the air-conditioning control device 102 in FIG. 7 illustrates a necessarily minimum configuration of the air-conditioning control device 102 in which data or system specifications that can be obtained from the outside are all placed to the outside. Operation data of the air-conditioning system including the outdoor air temperature, consumed electric power before change and a set room temperature after change is information essential to the air-conditioning control device 102. The configuration diagram of the air-conditioning control device 102 in FIG. 8 illustrates a configuration in which data or system specifications that can be obtained from the outside are all stored in the storage 115.

The storage 115 may store in the storage 115, as load data, the latent heat load and the sensible heat load of a human body at the set room temperature after change, may store in the storage 115, as air-conditioning system specifications, the heat exchange efficiency of the outdoor unit 12, the efficiency formula of the compressor 2, the heat exchange efficiency of the indoor unit 11, and the heat exchange efficiency of the ventilation device 13, and may store in the storage 115, as operation data of the air-conditioning system, consumed electric power at the set room temperature before change, the set room temperature after change, the air flow rate of the indoor unit 11, the air flow rate of the ventilation device 13, the outdoor air temperature, the outdoor air humidity, a condensing temperature, an evaporating temperature, a subcool (degree of subcooling), and a superheat (degree of superheat).

The following description uses the storage 115. However, for example, consumed electric power at the set room temperature before change does not need to be stored in the storage 115, but can be directly acquired from the outside, and thus is not essential to the storage 115. The heat exchange efficiency of the indoor unit 11 and the heat exchange efficiency of the ventilation device 13 may be stored in the indoor humidity estimation unit 112 instead of being stored in the storage 115. The heat exchange efficiency of the outdoor unit 12 and the efficiency formula of the compressor 2 may be stored in the refrigeration cycle estimation unit 113 instead of being stored in the storage 115. The set room temperature after change, the air flow rate of the indoor unit 11, the air flow rate of the ventilation device 13, the outdoor air temperature, and the outdoor air humidity can be directly acquired from the outside instead of being stored in the storage 115.

Despite of this description using the storage 115, in reality, the configuration of the air-conditioning control device 102 in FIG. 7 is a necessarily minimum configuration except for information of the outdoor air temperature, consumed electric power at the set room temperature before change, and the set room temperature after change. In a case of the configuration including the storage 115, it is obvious that not all pieces of data or specifications described above need to be included in the storage 115.

In the following description, information shown by the air-conditioning system specifications, the operation data of the air-conditioning system, and the load data is used to clearly specify that the embodiment is achievable. However, part of the information shown by the air-conditioning system specifications, the operation data of the air-conditioning system, and the load data may not be used and may be replaced with information in a format different from that of the information such as a database in a table format or a conversion formula.

The air-conditioning control device 102 is connected with the ventilation device 13 and the air-conditioning apparatus 10 through a communication line, and can store operation data of the air-conditioning system in the storage 115 and command the air-conditioning apparatus 10 for the refrigerant temperature (evaporating temperature) and the set room temperature.

The operation data of the air-conditioning system includes, for example, the set room temperature before and after change, the air flow rate of the indoor unit 11, the air flow rate of the ventilation device 13, the outdoor air temperature, and the outdoor air humidity. The operation data of the air-conditioning system can be stored in the storage 115.

For example, the air-conditioning control device 102 can store the temperature and humidity of outdoor air through the temperature and humidity sensor 19 installed outside, in the storage 115. The temperature and humidity sensor 19 may be independently installed or may be included in the ventilation device 13 or the outdoor unit 12 in advance.

The air-conditioning control device 102 is connected with the room occupancy sensor 21 and can store the number of occupants in the storage 115. When a temporally sequential pattern of the number of occupants is known in advance, the temporally sequential pattern may be stored in advance without using the room occupancy sensor 21. Alternatively, the number of occupants may be estimated from the air-conditioning system specifications and the operation data of the air-conditioning system, and the outdoor air temperature and humidity without providing the room occupancy sensor 21. The following describes a specific example.

FIG. 9 is a flowchart of occupant number estimation according to Embodiment 1 of the present invention. First, a total heat processing amount Q of the air-conditioning apparatus 10 is calculated from the refrigerant state of the air-conditioning apparatus 10 (ST101). The total heat processing amount Q can be calculated from the flow rate of refrigerant flowing to each indoor unit 11 and enthalpy change before and after the refrigerant passes through the indoor unit 11.

$$Q = G \times \Delta I$$

Q: Total heat processing amount [kW] of the air-conditioning apparatus 10, G: Refrigerant flow rate [kg/s] of the indoor unit 11, $\Delta I$: Enthalpy change amount [kJ/kg] of refrigerant passing through the indoor unit 11

When there are a plurality of indoor units 11, the amounts may be individually calculated and summed. The following refers to a formula when there is a single indoor unit 11, and thus when there are a plurality of indoor units, a value may be calculated for each indoor unit 11 and the resultant values are summed.

Subsequently, a sensible heat processing amount $Q_{is}$ of the air-conditioning apparatus 10 is calculated from the air state (ST102).

$$Q_{is} = \rho_a \times C_p \times V_a \times \eta aT \times \varphi \times (T_{in} - T_{hex})$$

$Q_{is}$: Sensible heat processing amount [kW] of the indoor unit 11, $\rho_a$: Air density [kg/m³], $C_p$: Air specific heat [kJ/kgK], $V_a$: Air flow rate of the indoor unit 11 [m³/s], $\eta aT$: Temperature exchange efficiency of the indoor unit 11, $\varphi$: Operation rate of the indoor unit 11, $T_{in}$: Temperature [K] of suction air, $T_{hex}$: Temperature [K] of heat exchanger surface temperature Consequently, a sensible heat factor (SHF), which is the ratio of the sensible heat processing amount in the total heat processing amount of the air-conditioning apparatus 10, can be calculated (ST103).

$$SHF = Q_{is}/Q$$

SHF: Sensible heat processing ratio, Q: Total heat processing amount [kW] of the air-conditioning apparatus 10

The SHF can be expressed as described below from the air state by using a formula for calculating the sensible heat processing amount and a formula for calculating the latent heat processing amount.

$$SHF = (T_{in} - T_{hex})/(I_{in} - I_{hex})$$

SHF: Sensible heat processing ratio, $T_{in}$: Temperature [K] of suction air, $T_{hex}$: Temperature [K] of heat exchanger surface temperature, $I_{in}$: Enthalpy [kJ/kgK] of indoor air, $I_{hex}$: Enthalpy [kJ/kgK] of saturated air at heat exchanger surface temperature The enthalpy of the indoor space 101 can be calculated by solving this expression for $I_{in}$ (ST104). As the temperature and enthalpy of the indoor space 101 are obtained, a sensible heat load $Q_{vs}$ and a latent heat load $Q_{vl}$ of the ventilation device 13 can be calculated (ST105).

$$Q_v = \rho_a \times C_p \times V_v \times \eta vT \times (I_{out} - I_{in})$$

$$Q_{vs} = \rho_a \times C_p \times V_v \times \eta vT \times (T_{out} - T_{in})$$

$$Q_{vl} = Q_v - Q_{vs}$$

$Q_v$: total heat load [kW] of the ventilation device 13, $Q_{vs}$: Sensible heat load [kW] of the ventilation device 13, $Q_{vl}$: Latent heat load [kW] of the ventilation device 13, $\rho_a$: Air density [kg/m³], $C_p$: Air specific heat [kJ/kgK], $V_v$: Ventilation air flow rate [m³/s] of the ventilation device 13, $\eta vT$: Temperature exchange efficiency of the total heat exchanger 133, $I_{out}$: Enthalpy [kJ/kgK] of outdoor air, $I_{in}$: Enthalpy [kJ/kgK] of indoor air, $T_{out}$: Temperature [K] of outdoor air, $T_{in}$: Temperature [K] of air in the indoor space 101

When the latent heat processing amount of the indoor unit 11 is considered to balance with the sum of the latent heat load of the ventilation device 13 and the human body latent heat load, a human body latent heat load $Q_{pl}$ can be calculated (ST106).

$$Q_{pl} = Q_l - Q_{vl}$$

$Q_{pl}$: Human body latent heat load [kW], $Q_l$: Processing latent heat amount [kW] of the indoor unit 11, $Q_{vl}$: Latent heat load [kW] of the ventilation device 13

FIG. 10 is a diagram illustrating human body loads according to Embodiment 1 of the present invention. More specifically, FIG. 10 illustrates an example in which the sensible heat and the latent heat of a human body generated load are shown for each temperature and each activity. For example, the number of occupants can be estimated by obtaining a latent heat load per human body from this table and dividing the latent heat load per human body (ST107).

$$N_p = Q_{pl}/Q_{pl\_1}$$

$N_p$: Number of occupants, $Q_{ps\_1}$: Latent heat load [kW] per human body

With the configuration as described above, the number of occupants may be estimated from the air-conditioning system specifications, the operation data of the air-conditioning system, and the outdoor air temperature and humidity without using the room occupancy sensor 21.

The air-conditioning control device 102 is connected with the electric power meter 20 and can store the generation heat of the illumination apparatus 17, the generation heat of the office automation apparatus 16, and the electric power consumed by the air-conditioning apparatus 10 in the storage 115. The electric power meter 20 may be independently installed or may be included in each of the illumination apparatus 17, the office automation apparatus 16, and the air-conditioning apparatus 10 in advance.

In addition, a sensible heat load generated when the indoor space 101 reaches a set room temperature input by the user, and the human body latent heat load by the person 18 can be calculated as load data and stored in the storage 115.

The sum of the generation heat of the office automation apparatus 16 and the generation heat of the illumination apparatus 17 can be estimated as internal generation heat from the air-conditioning system specifications, the operation data, and the outdoor air temperature and humidity.

Figure 11:
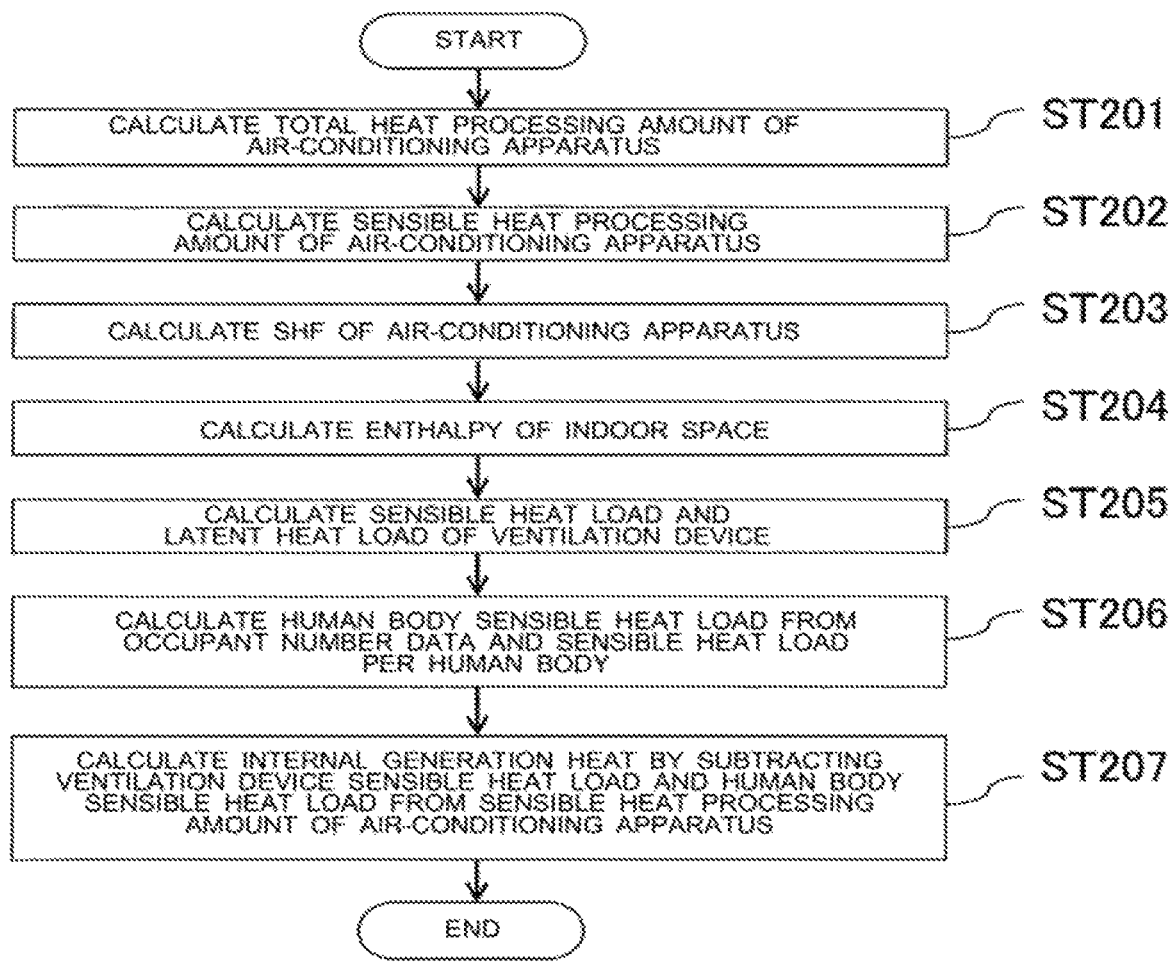
FIG. 11 is a flowchart of internal generation heat estimation according to Embodiment 1 of the present invention.

FIG. 11 is a flowchart of internal generation heat estimation according to Embodiment 1 of the present invention. The total heat processing amount Q of the air-conditioning apparatus 10 is calculated from the refrigerant state of the air-conditioning apparatus 10 (ST201). The sensible heat processing amount $Q_{ts}$ of the air-conditioning apparatus 10 is calculated from the air state (ST202). The SHF, which is the ratio of the sensible heat processing amount in the total heat processing amount of the air-conditioning apparatus 10, is calculated (ST203). The enthalpy of the indoor space 101 is calculated (ST204). The sensible heat load $Q_{vs}$ and the latent heat load $Q_{vl}$ of the ventilation device 13 are calculated (ST205). ST201 to ST205 are completely the same as ST101 to ST105 in the process of estimating the number of occupants, and thus detailed description of ST201 to ST205 is omitted.

Subsequently, a sensible heat load $Q_{ps}$ of a human body is calculated by using data of the number of occupants (including an estimated number) and a sensible heat load per human body illustrated in FIG. 10 (ST206).

$$Q_{ps}=Q_{ps\_1} \times N_p$$

$Q_{ps}$: Sensible heat load [kW] of human body, $Q_{ps\_1}$: Sensible heat load [kW] per person, $N_p$: Number of occupants When the sensible heat processing amount of the air-conditioning apparatus 10 is considered to balance with the sum of the sensible heat load of the ventilation device 13, the human body sensible heat load, the generation heat of the illumination apparatus 17, and the generation heat of the office automation apparatus 16, the sum of the generation heat of the illumination apparatus 17 and the generation heat of the office automation apparatus 16, in other words, the internal generation heat can be calculated (ST207).

$$Q_{hl}+Q_{he}=Q_s-Q_{vs}-Q_{ps}$$

$Q_{hl}$: Generation heat [kW] of the illumination apparatus 17, $Q_{he}$: Generation heat [kW] of the office automation apparatus 16, $Q_s$: Processing latent heat amount [kW] of the air-conditioning apparatus 10, $Q_{vs}$: Sensible heat load [kW] of the ventilation device 13, $Q_{ps}$: Human body sensible heat load [kW]

Figure 12:
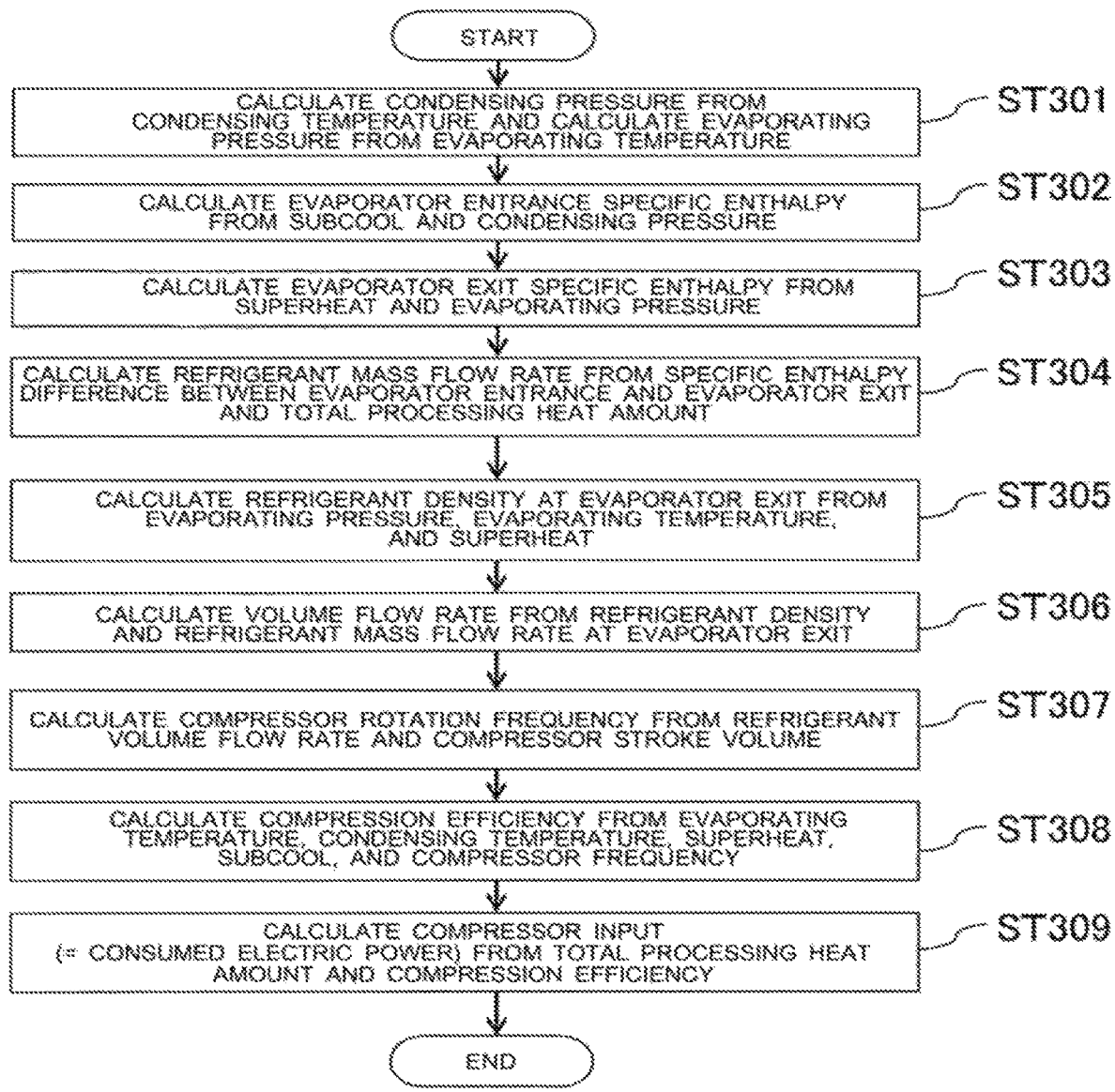
FIG. 12 is a flowchart of consumed electric power estimation according to Embodiment 1 of the present invention.

FIG. 12 is a flowchart of consumed electric power estimation according to Embodiment 1 of the present invention. The condensing temperature, the evaporating temperature, the superheat, and the subcool are measured as the physical quantity at each point of a refrigeration cycle. In the process of the consumed electric power estimation, first, condensing pressure is calculated from the condensing temperature, and evaporating pressure is calculated from the evaporating temperature (ST301). Subsequently, the specific enthalpy at the evaporator entrance is calculated from the subcool and the condensing pressure (ST302). The specific enthalpy at the evaporator exit is calculated from the superheat and the evaporating pressure (ST303). The mass flow rate of refrigerant is calculated from a specific enthalpy difference between the evaporator entrance and the evaporator exit and a total processing heat amount (ST304). The density of refrigerant at the evaporator exit is calculated from the evaporating pressure, the evaporating temperature, and the superheat (ST305). A volume flow rate is calculated from the density and mass flow rate of refrigerant at the evaporator exit (ST306). The rotation frequency of the compressor 2 is calculated from the volume flow rate of refrigerant and the stroke volume of the compressor 2 (ST307). When the frequency of the compressor 2 is known, ST301 to ST307 may be omitted.

Subsequently, the compression efficiency of the compressor 2 is calculated from the evaporating temperature, the condensing temperature, the superheat, the subcool, and the compressor frequency (ST308). Lastly, an input value to the compressor 2, in other words, consumed electric power is calculated from the total processing heat amount and the compression efficiency (ST309). As described above, as the physical quantity at each point of the refrigeration cycle can be determined from the operation data of the air-conditioning apparatus 10, the estimated consumed electric power can be calculated by using the physical quantities.

Figure 13:
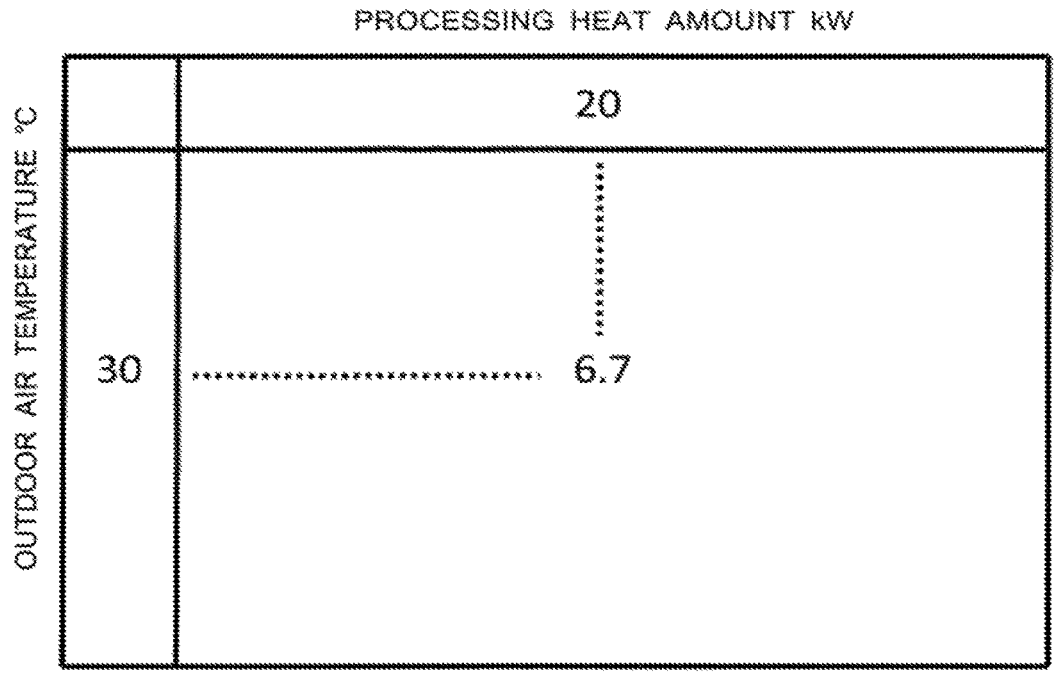
FIG. 13 is a diagram illustrating consumed electric power estimation using a table according to Embodiment 1 of the present invention.

Unlike such a method, the consumed electric power estimation may be more easily determined by referring to a table prepared in advance. FIG. 13 is a diagram illustrating the consumed electric power estimation by using a table. This table can be used to estimate the consumed electric power when the outdoor air temperature and the processing heat amount of the air-conditioning apparatus 10 are known. In this example, the outdoor air temperature is 30 degrees C., and the electric power consumed by the air-conditioning apparatus 10 at a processing heat amount of 20 kW is determined to be 6.7 kW. When the table does not include the combination of the outdoor air temperature and the processing heat amount, for example, the consumed electric power can be obtained through interpolation from a similar combination in the table. As shown above, the consumed electric power estimation is not difficult and can be performed by using another estimation method.

As described above, the number of occupants, the internal generation heat, the consumed electric power, and other factors can be determined by calculation when these factors cannot be directly obtained. When measurement of consumed electric power at the electric power meters 20 installed on the room occupancy sensor 21, the office automation apparatus 16, and the illumination apparatus 17 can be omitted, storage in the storage 115 does not need to be performed. In this manner, in the air-conditioning control device 102, as long as factors for calculation at the refrigerant temperature calculation unit 111, the indoor humidity estimation unit 112, and the refrigeration cycle estimation unit 113 are available, the factors may be acquired in any way.

The following describes operation of the air-conditioning control device 102 during a cooling operation. In a case of a heating operation, the evaporating temperature and the condensing temperature are interchanged with each other, and the evaporating temperature and the condensing temperature are collectively defined as the refrigerant temperature. The air-conditioning control device 102 reads the air-conditioning system specifications, the operation data of the air-conditioning system, and the load data stored in the storage 115, from the storage 115, and calculates the refrigerant temperature, which is the evaporating temperature (or the condensing temperature).

The air-conditioning system specifications are specifically the heat exchange efficiency of the indoor unit 11, the heat exchange efficiency of the outdoor unit 12, the efficiency formula of the compressor 2, and the heat exchange efficiency of the ventilation device 13. The operation data of the air-conditioning system is specifically the consumed electric power at the set room temperature before change, the set room temperature after change, the air flow rate of the indoor unit 11, the air flow rate of the ventilation device 13, the outdoor air temperature, and the outdoor air humidity.

Figure 14:
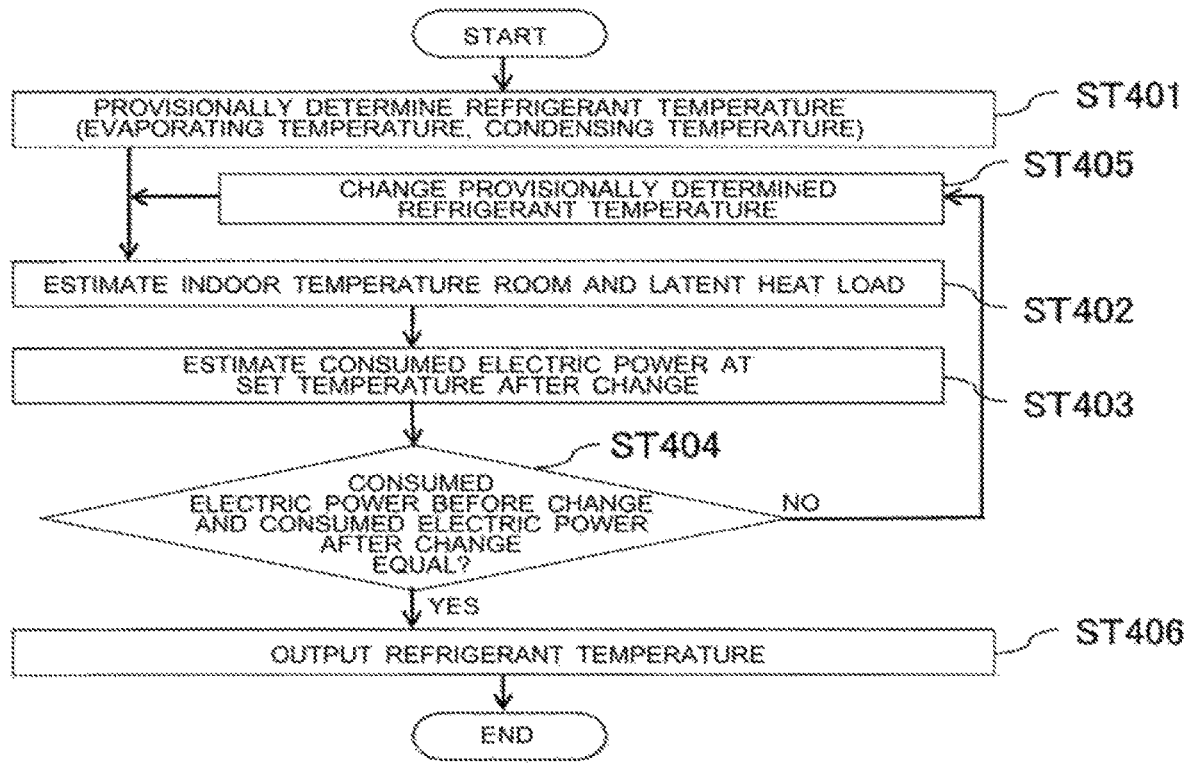
FIG. 14 is a flowchart of the air-conditioning control device according to Embodiment 1 of the present invention.

FIG. 14 is a flowchart of the air-conditioning control device 102 according to Embodiment 1 of the present invention. First, the refrigerant temperature calculation unit 111 provisionally determines the refrigerant temperature, which is the evaporating temperature (or the condensing temperature) as a parameter, and outputs the refrigerant temperature to the indoor humidity estimation unit 112 (ST401). The indoor humidity estimation unit 112 estimates by calculation of the indoor humidity and the latent heat load when the operation rate (the ratio of a time in which the heat amount is processed by the air-conditioning apparatus 10 relative to the operational time) of the air-conditioning apparatus 10 is determined by using the set room temperature of the air-conditioning apparatus 10 including the refrigeration cycle after change, the refrigerant temperature, which is the evaporating temperature (or the condensing temperature) output from the indoor humidity estimation unit 112, the air flow rate and heat exchange efficiency of the indoor unit 11 of the air-conditioning apparatus 10, the air flow rate and heat exchange efficiency of the ventilation device 13, the outdoor air temperature, the outdoor air humidity, and the sensible heat load and the human body latent heat load at the set room temperature after change (ST402).

The refrigeration cycle estimation unit 113 estimates the electric power consumed by the air-conditioning apparatus 10 at the set room temperature after change from the operation state of the refrigeration cycle by using the indoor humidity and the latent heat load estimated by the indoor humidity estimation unit 112, the refrigerant temperature, which is the evaporating temperature (or the condensing temperature), the outdoor air temperature and the outdoor air humidity, the heat exchange efficiency of the outdoor unit 12 of the air-conditioning apparatus 10, the efficiency formula of the compressor 2, and the sensible heat load at the set room temperature after change (ST403).

The refrigerant temperature calculation unit 111 determines by comparison whether the electric power consumed by the air-conditioning apparatus 10 at the set room temperature before change and the electric power consumed by the air-conditioning apparatus 10 at the set room temperature after change estimated by the refrigeration cycle estimation unit 113 equal each other (ST404), and repeatedly changes the refrigerant temperature as a parameter in stages until the agreement is made, in other words, until the estimated consumed electric power equals the electric power consumed by the air-conditioning apparatus 10 at the set room temperature before change (ST405). When the consumed electric powers before and after change of the set room temperature equal each other (the estimated consumed electric power converges to the electric power consumed by the air-conditioning apparatus 10 at the set room temperature before change), the refrigerant temperature calculation unit 111 controls the air-conditioning apparatus 10 by commanding the air-conditioning apparatus 10 for the refrigerant temperature corresponding to the consumed electric power after change of the set room temperature that equals the consumed electric powers before change of the set room temperature (the electric power consumed by the air-conditioning apparatus 10 at the set room temperature before change to which the estimated consumed electric power is converged) (ST406).

The criterion of the determination that the consumed electric powers before and after change of the set room temperature equal each other is as follows. For example, to change the refrigerant temperature in stages, the determination is performed by selecting the refrigerant temperature in a case in which the consumed electric powers before and after change of the set room temperature are closest to each other, or the refrigerant temperature for a consumed electric power not exceeding the consumed electric power before change of the set room temperature but closest to the consumed electric power before change. In this manner, the agreement includes not only complete agreement but also effective agreement at a level of calculational agreement.

Alternatively, an error threshold for determining the agreement may be provided in advance, and it may be determined that the agreement is made when the absolute value of error is equal to or smaller than the threshold. For example, in a case in which the error threshold is defined to be 1 kW, it can be determined that the agreement is made when the absolute value of the difference between the consumed electric power before change of the set room temperature and the consumed electric power after change of the set room temperature is equal to or smaller than 1 kW. In this case, it is determined that the agreement is made when the consumed electric power after change of the set room temperature is in a range of −1 to +1 kW centered at the consumed electric power before change of the set room temperature.

The following description is given to a case where the ventilation device 13 exists, but the sensible heat and latent heat loads of the ventilation device 13 can be defined to be zero when the ventilation device 13 does not exist. The heat exchange efficiency of the ventilation device 13 is zero, in other words, the air flow rate of the ventilation device 13 is treated to be zero.

FIG. 10 illustrates an example in which the sensible heat and the latent heat of a human body generated load are shown for each temperature and each activity. With reference to FIG. 10, for each activity, the total heat load of a human body does not change with room temperature, but the ratio between the sensible heat load and the latent heat load changes. For example, in a case of an office work, the sensible heat load is 55 W when the room temperature is 28 degrees C., but the sensible heat load increases to 92 W when the room temperature is 22 degrees C. Simultaneously, the latent heat load decreases from 66 W to 29 W, and thus the sum of the sensible heat load and the latent heat load is maintained at 121 W. The sensible heat load per person can be determined from the drawing and multiplied by the number of occupants to obtain the sensible heat load. For example, when the number of occupants is 100 at 26 degrees C., the human body sensible heat load is calculated by 69 (W/person)×100 (people)=6,900 (W).

In this manner, the human body sensible heat load per person at the set room temperature after change can be determined from the table and multiplied by the number of occupants to calculate the human body sensible heat load. Similarly, the latent heat load per person can be determined from the table and multiplied by the number of occupants to obtain the human body latent heat load at the set room temperature after change.

In addition, the sensible heat load $Q_{vs}$ of the ventilation device 13 at the set room temperature after change can be calculated by the equation below.

$$Q_{vs} = \rho_a \times C_p \times V_v \times \eta vT \times (T_{out} - T_{in})$$

$Q_{vs}$: Sensible heat load [kW] of the ventilation device 13, $\rho_a$: Air density [kg/m³], $C_p$: Air specific heat [kJ/kgK], $V_v$: Ventilation air flow rate [m³/s] of the ventilation device 13, $\eta vT$: Temperature exchange efficiency of the total heat exchanger 133, $T_{out}$: Outdoor air temperature [K], $T_{in}$: Temperature [K] of air in the indoor space 101

The calculation may be performed by using predetermined values for the air density and the air specific heat, values stored in the operation data of the air-conditioning system for the ventilation air flow rate of the ventilation device 13 and the indoor air temperature, a value stored in the air-conditioning system specifications for the temperature exchange efficiency of the total heat exchanger 133, and a value stored as the outdoor air temperature and humidity for the outdoor air temperature.

Lastly, the human body latent heat load at the set room temperature after change can be calculated by defining as the sensible heat load, the sum of the human body and ventilation sensible heat loads at the set room temperature after change, the generation heat of the illumination apparatus 17, and the generation heat of the office automation apparatus 16.

First, the refrigerant temperature calculation unit 111 provisionally determines the refrigerant temperature, which is the evaporating temperature (or the condensing temperature) as a parameter (ST401).

Subsequently, the indoor humidity estimation unit 112 calculates the operation rate of the indoor unit 11. The operation rate can be obtained by solving the equation below for the operation rate φ of the indoor unit 11 when the indoor unit 11 is considered to process the sensible heat load without overage and shortage.

$$Q_s = \rho_a \times C_p \times V_a \times \eta i \times \varphi \times (T_{in} - T_{hex})$$

$Q_s$: Processing latent heat amount [kW] of the air-conditioning apparatus 10, $\rho_a$: Air density [kg/m³], $C_p$: Air specific heat [kJ/kgK], $V_a$: Air flow rate of the indoor unit 11, ηi: Heat exchange efficiency of the indoor unit 11, φ: Operation rate of the indoor unit 11, $T_{in}$: Temperature [K] of suction air, $T_{hex}$: Temperature [K] of heat exchanger surface temperature The indoor humidity estimation unit 112 calculates the indoor humidity and the latent heat load on the basis of the calculated operation rate φ of the indoor unit 11. In other words, the indoor humidity estimation unit 112 determines the indoor humidity so that the latent heat load balances with the processing latent heat amount of the air-conditioning apparatus 10.

Figure 15:
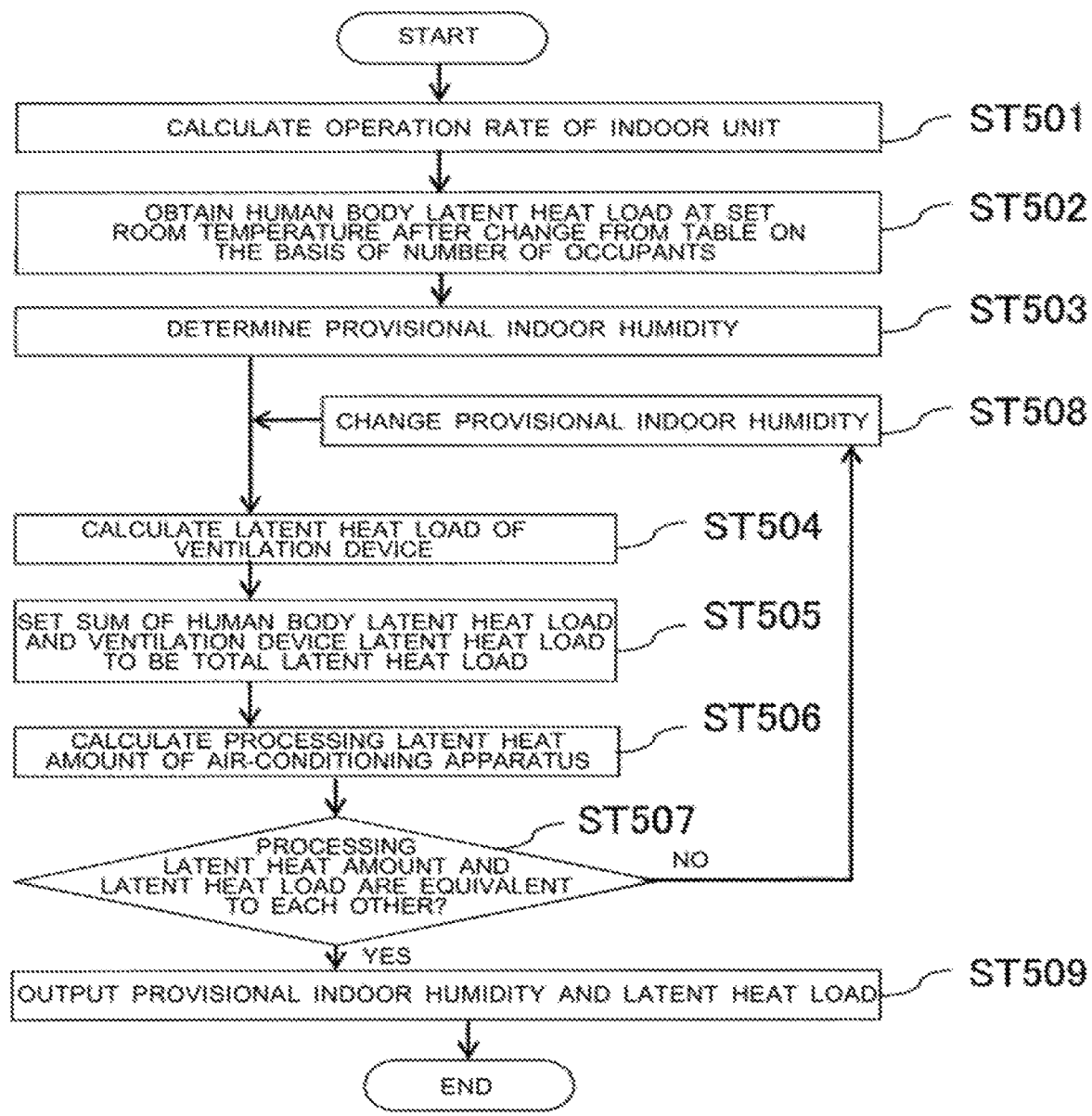
FIG. 15 is a flowchart of an indoor humidity estimation unit according to Embodiment 1 of the present invention.

FIG. 15 is a flowchart of the indoor humidity estimation unit 112 according to Embodiment 1 of the present invention. First, as described above, the operation rate p of the indoor unit 11 is calculated (ST501). With reference to the table illustrated in FIG. 10, the human body latent heat load is determined by the set room temperature but does not depend on the indoor humidity. Thus, the human body latent heat load at the set room temperature after change can be obtained from the table on the basis of the number of occupants (ST502). Subsequently, a provisional indoor humidity is determined (ST503), and the latent heat load of the ventilation device 13 is calculated (ST504). The latent heat load $Q_v$ of the ventilation device 13 can be calculated by the equation below.

$$Q_{vl} = \rho_a \times C_p \times V_v \times \eta v T \times (I_{in} - I_{out}) - Q_{vs}$$

$Q_v$: Latent heat load [kW] of the ventilation device 13, $\rho_a$: Air density [kg/m³], $C_p$: Air specific heat [kJ/kgK], $V_v$: Ventilation air flow rate [m³/s] of the ventilation device 13, ηvT: Enthalpy exchange efficiency of the indoor unit 11, $I_{in}$: Indoor air enthalpy [kJ/kgK], $I_{out}$: Outdoor air enthalpy [kJ/kgK], $Q_{vs}$: Latent heat load [kW] of the ventilation device 13

When the latent heat loads of the interior 101b are considered to be caused by only a human body and the ventilation device 13, the sum of the human body latent heat load and the latent heat load of the ventilation device 13 are defined to be the total latent heat load (ST505).

Subsequently, the processing latent heat amount of the air-conditioning apparatus 10 is calculated (ST506). The processing latent heat amount $Q_l$ of the air-conditioning apparatus 10 can be calculated by the equation below.

$$Q_l = \rho_a \times C_p \times V_a \times \eta_a \times (I_{in} - I_{hex}) - Q_s$$

$Q_l$: Processing latent heat amount [kW] of the air-conditioning apparatus 10, $\rho_a$: Air density [kg/m³], $C_p$: Air specific heat [kJ/kgK], $V_a$: Air flow rate of the indoor unit 11, ηa: Enthalpy exchange efficiency of the total heat exchanger 133, $I_{in}$: Indoor air enthalpy [kJ/kgK], $I_{hex}$: Enthalpy [kJ/kgK] of saturated air at heat exchanger surface temperature, $Q_s$: Processing latent heat amount [kW] of the air-conditioning apparatus 10

Whether the total latent heat load and the processing latent heat amount are equivalent to each other is checked (ST507), and when there is a difference between the total latent heat load and the processing latent heat amount, the provisional indoor humidity is changed, and the process repeats from the calculation of the latent heat load of the ventilation device 13 (ST508). When the latent heat load and the processing latent heat amount are equivalent to each other, the provisional indoor humidity is defined as the indoor humidity and output together with the latent heat load (ST509).

Subsequently, the refrigeration cycle estimation unit 113 calculates consumed electric power at the set room temperature after change on the basis of the indoor humidity and the latent heat load determined by the indoor humidity estimation unit 112 (ST509), the refrigerant temperature, which is the evaporating temperature (or the condensing temperature) provisionally determined by the refrigerant temperature calculation unit 111 (ST401), the sensible heat load at the set room temperature after change, and the heat exchange efficiency of the outdoor unit 12 and the efficiency formula of the compressor 2, which are included in the air-conditioning system specifications.

Figure 16:
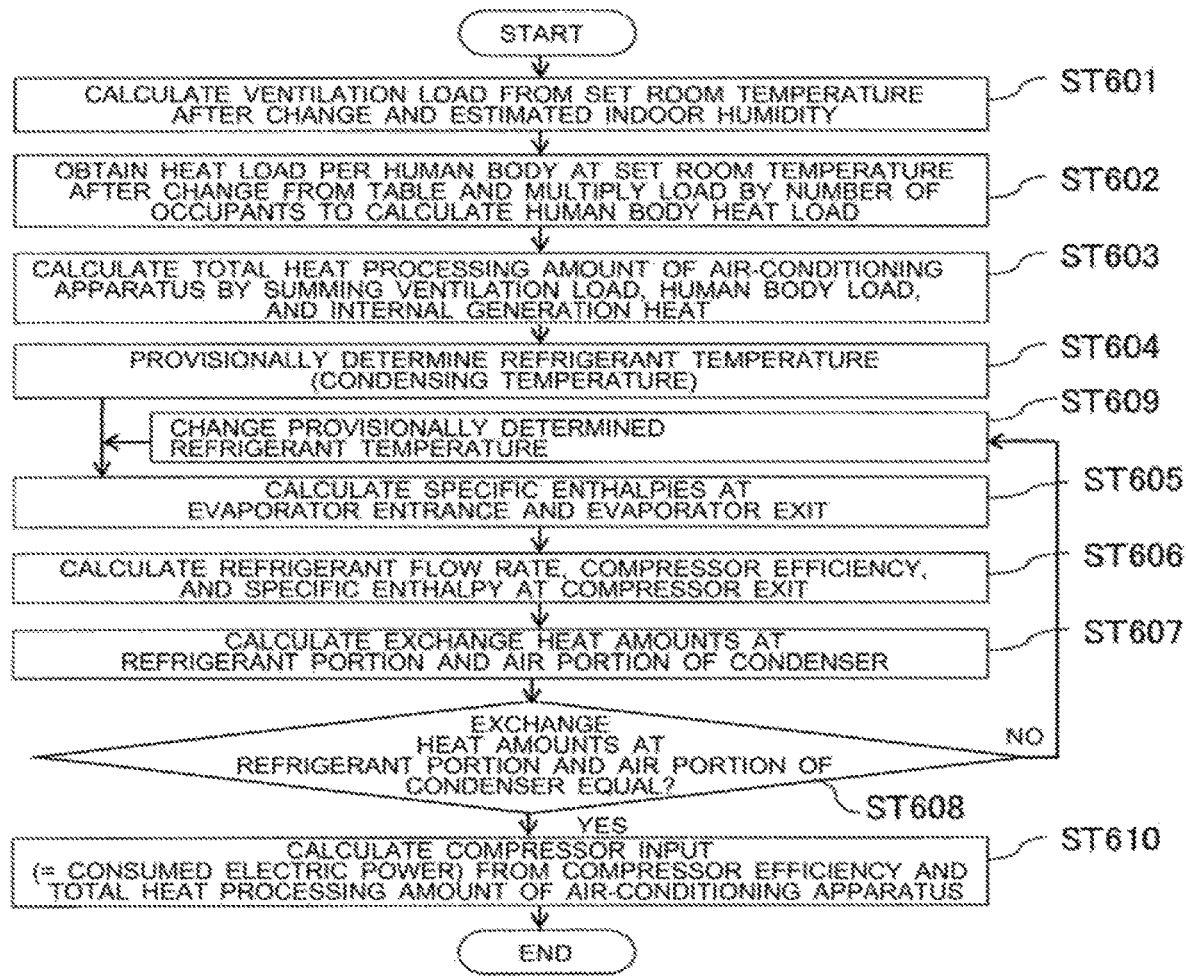
FIG. 16 is a flowchart of a refrigeration cycle estimation unit according to Embodiment 1 of the present invention.

FIG. 16 is a flowchart of the refrigeration cycle estimation unit 113 according to Embodiment 1 of the present invention. To calculate the total heat processing amount of the air-conditioning apparatus 10 after change of the set room temperature, the refrigeration cycle estimation unit 113 first calculates a ventilation load from the set room temperature after change and the estimated indoor humidity (ST601). Subsequently, the heat load per human body at the set room temperature after change is determined from the table and multiplied by the number of occupants to calculate a human body heat load (ST602). The ventilation load, the human body load, and the internal generation heat determined in advance are summed to calculate the total heat processing amount of the air-conditioning apparatus 10 (ST603).

Subsequently, the operation state of the refrigeration cycle is predicted. First, an appropriate refrigerant temperature (the condensing temperature at cooling or the evaporating temperature at heating, the following description is given in a case of cooling) is provisionally determined (ST604). The evaporator entrance and evaporator exit specific enthalpies at the evaporator entrance and the evaporator exit are calculated (ST605). In this case, the superheat and the subcool are unknown, and thus their control target values are provided.

The flow rate of refrigerant can be calculated from the specific enthalpy difference between the evaporator entrance and the evaporator exit and the total heat exchange amount, and the density of refrigerant at the compressor entrance can be calculated from the evaporating pressure, the evaporating temperature, and the superheat (ST606). In this manner, the volume flow rate of refrigerant at the compressor entrance can be calculated, and the compressor frequency can be calculated from the stroke volume of the compressor. The efficiency of the compressor can be calculated from the evaporating temperature, the condensing temperature, the superheat, and the subcool, and the specific enthalpy at the compressor exit is calculated from the total heat processing amount and the specific enthalpy at the compressor entrance (ST607).

The heat exchange amount of the condenser can be calculated from the difference between the specific enthalpy and the evaporator entrance specific enthalpy (=the condenser exit specific enthalpy) and the refrigerant flow rate (ST607). The heat exchange amount is defined as a heat exchange amount calculated from the refrigerant state. In addition, how much heat of the air is transferred is calculated from the heat exchanger performance and the condensing temperature (ST607). This heat exchange amount is defined as a heat exchange amount calculated from the air state.

When the heat exchange amount calculated from the refrigerant state and the heat exchange amount calculated from the air state do not equal each other (in a case of NO at ST608), the provisionally determined refrigerant temperature is changed (ST609), and the specific enthalpies at the evaporator entrance and the evaporator exit are calculated (ST605). When the heat exchange amount calculated from the refrigerant state and the heat exchange amount calculated from the air state equal each other (in a case of YES at ST608), a compressor input (=consumed electric power) is calculated from the compressor efficiency and the total heat processing amount of the air-conditioning apparatus 10 (ST610).

Subsequently, the refrigerant temperature calculation unit 111 compares the consumed electric power at the set room temperature after change, which is calculated by the refrigeration cycle estimation unit 113, with the consumed electric power at the set room temperature before change. The consumed electric power at the set room temperature before change is the electric power currently consumed by the air-conditioning apparatus 10, and thus a value such as a value obtained from the electric power meters 20 and a value obtained through the above-described consumed electric power estimation may be used.

When the consumed electric powers before and after change of the set room temperature equal each other (when the estimated consumed electric power has converged to the electric power consumed by the air-conditioning apparatus 10 at the set room temperature before change), the refrigerant temperature, which is the evaporating temperature (or the condensing temperature) in this state is output and the air-conditioning apparatus 10 is commanded for the evaporating temperature (or the condensing temperature) together with the changed set room temperature (ST406). When the consumed electric powers before and after change of the set room temperature do not equal each other (when the estimated consumed electric power has not converged to the electric power consumed by the air-conditioning apparatus 10 at the set room temperature before change), the refrigerant temperature, which is the provisionally determined evaporating temperature (or the condensing temperature) is changed to repeat the calculation from the operation rate of the indoor unit 11 (ST405).

In particular, when the refrigerant temperature calculation unit 111 cannot calculate the refrigerant temperature at which the consumed electric powers before and after change of the set room temperature equal each other (when the estimated consumed electric power has not converged to the electric power consumed by the air-conditioning apparatus 10 at the set room temperature before change), the refrigerant temperature calculation unit 111 calculates the refrigerant temperature by shifting the set room temperature after change in stages toward the set room temperature before change until the refrigerant temperature is calculated by the refrigerant temperature calculation unit 111. Consequently, the air-conditioning system can be operated at a set room temperature close to a set room temperature desired by the user.

The air-conditioning control device of the air-conditioning apparatus includes the indoor humidity estimation unit configured to estimate the indoor humidity and the latent heat load at the set room temperature of the air-conditioning apparatus including the refrigeration cycle after change when the indoor humidity estimation unit receives at least the set room temperature after change and the refrigerant temperature as a parameter to be changed, the refrigeration cycle estimation unit configured to estimate consumed electric power at the set room temperature after change when the refrigeration cycle estimation unit receives at least the outdoor air temperature, the refrigerant temperature received by the indoor humidity estimation unit, and the indoor humidity and the latent heat load estimated by the indoor humidity estimation unit, and a refrigerant temperature calculation unit configured to command the air-conditioning apparatus for a refrigerant temperature calculated by repeating the estimation at the indoor humidity estimation unit and the refrigeration cycle estimation unit while changing the refrigerant temperature until the electric power consumed by the air-conditioning apparatus at the set room temperature before change and the consumed electric power estimated by the refrigeration cycle estimation unit equal each other. Thus, the air-conditioning system can be operated at a set room temperature desired by the user without changing the electric power consumed by the air-conditioning system.

The refrigerant temperature calculation unit repeats the estimation at the indoor humidity estimation unit and the refrigeration cycle estimation unit while changing the refrigerant temperature and, when the consumed electric power estimated by the refrigeration cycle estimation unit equals the electric power consumed by the air-conditioning apparatus at the set room temperature before change, and commands the air-conditioning apparatus for the refrigerant temperature corresponding to the electric power consumed by the air-conditioning apparatus at the set room temperature before change. When the consumed electric power estimated by the refrigeration cycle estimation unit does not equal the electric power consumed by the air-conditioning apparatus at the set room temperature before change, the refrigerant temperature calculation unit is configured to calculate the refrigerant temperature by shifting the set room temperature after change toward the set room temperature before change in stages until the refrigerant temperature is calculated by the refrigerant temperature calculation unit, and the air-conditioning apparatus is commanded for the refrigerant temperature. Consequently, the air-conditioning system can be operated at a set room temperature desired by the user without changing the electric power consumed by the air-conditioning system.

The air-conditioning control method includes an indoor humidity estimation step of estimating the indoor humidity and the latent heat load at the set room temperature of the air-conditioning apparatus including the refrigeration cycle after change by inputting at least the set room temperature after change and the refrigerant temperature as a parameter to be changed, a refrigeration cycle estimation step of estimating consumed electric power at the set room temperature after change by inputting at least the outdoor air temperature, the refrigerant temperature received at the indoor humidity estimation step, and the indoor humidity and the latent heat load estimated at the indoor humidity estimation step, and a refrigerant temperature calculation step of commanding the air-conditioning apparatus for the refrigerant temperature calculated by repeating the estimation at the indoor humidity estimation step and the refrigeration cycle estimation step while changing the refrigerant temperature until the consumed electric power estimated at the refrigeration cycle estimation step equals electric power consumed by the air-conditioning apparatus at the set room temperature before change. Consequently, the air-conditioning system can be operated at a set room temperature desired by the user without changing the electric power consumed by the air-conditioning system.

Management of activation, stop, and other operation of the air-conditioning system including the set room temperature (in particular, the set room temperature at activation) can be performed by a system management unit (not illustrated) different from the air-conditioning control device 102. When the system management unit is provided in a management room different from the indoor space 101, which is the target of the air-conditioning control device 102, an occupant in the indoor space 101 is prevented from changing activation, stop, and other operation of the air-conditioning system without permission. Consequently, an energy manager (cost manager) can manage, from the management room, consumed electric power, in other words, the activation time of the air-conditioning system.

During activation of the air-conditioning system, when the set room temperature is changed by an occupant in the indoor space 101 as appropriate, consumed electric power does not change in the invention of the present application. Thus, an input unit (not illustrated) for changing the set room temperature can be provided in the indoor space 101, which is the control target of the air-conditioning control device 102. The input unit for changing the set room temperature may be integrally provided with the air-conditioning control device 102 or may be provided in the vicinity of the air-conditioning control device 102.

As operation is possible without change in the electric power consumed by the air-conditioning apparatus 10 before and after change of the set room temperature, the user (indoor occupant) of the air-conditioning apparatus 10 can change the set room temperature without permission from the energy manager (cost manager) of the air-conditioning apparatus 10, thereby achieving comfort.

Normally, the energy manager intends to achieve cost reduction by energy saving, but the technological idea of the invention of the present application is completely different from that oriented to energy saving. This is because the invention of the present application is oriented to stay of the user in a more comfortable state with an equivalent consumption amount of energy (electric power), which does not leads to energy saving.

As described above, the description of Embodiment 1 is made on an office as an example, but the present technology is also applicable to a home air-conditioning system. Typically, the set room temperature of a home air-conditioning system can be freely changed by a resident, and no energy manager who restricts usage exists. However, the characteristic that the electric power consumed by the air-conditioning apparatus changes along with change of the set room temperature is not different from that of the case of an office. When the present technology is applied, the resident can change the set room temperature without electric power change through trade-off with humidity change, and can pursue comfort without worrying about electric power.

Embodiment 2

Figure 17:
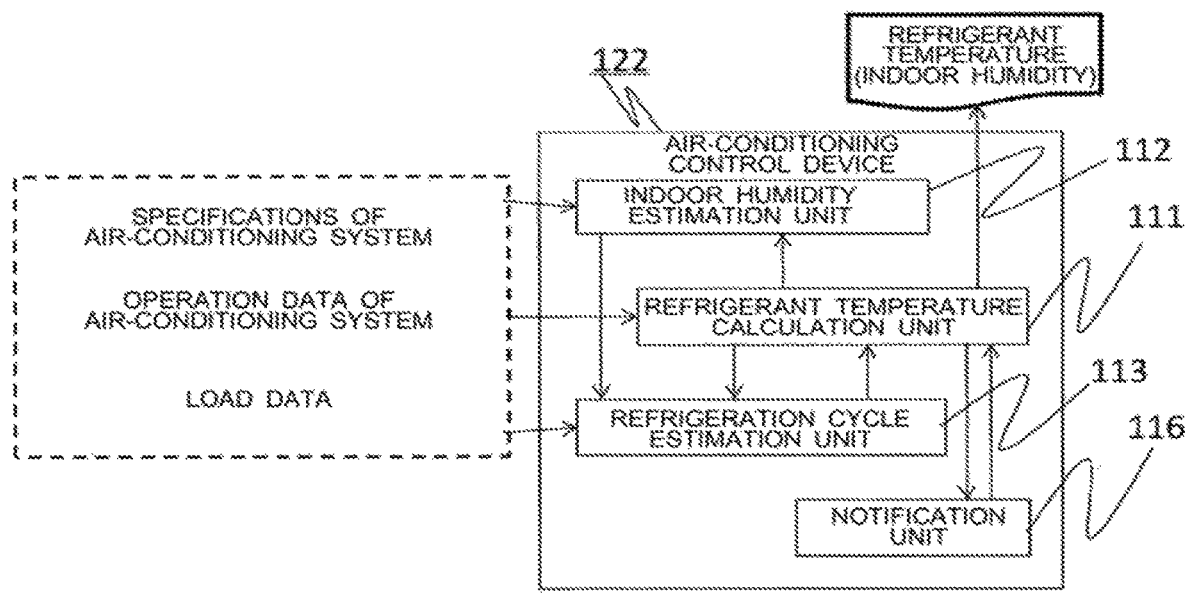
FIG. 17 is a configuration diagram of an air-conditioning control device according to Embodiment 2 of the present invention.
Figure 18:
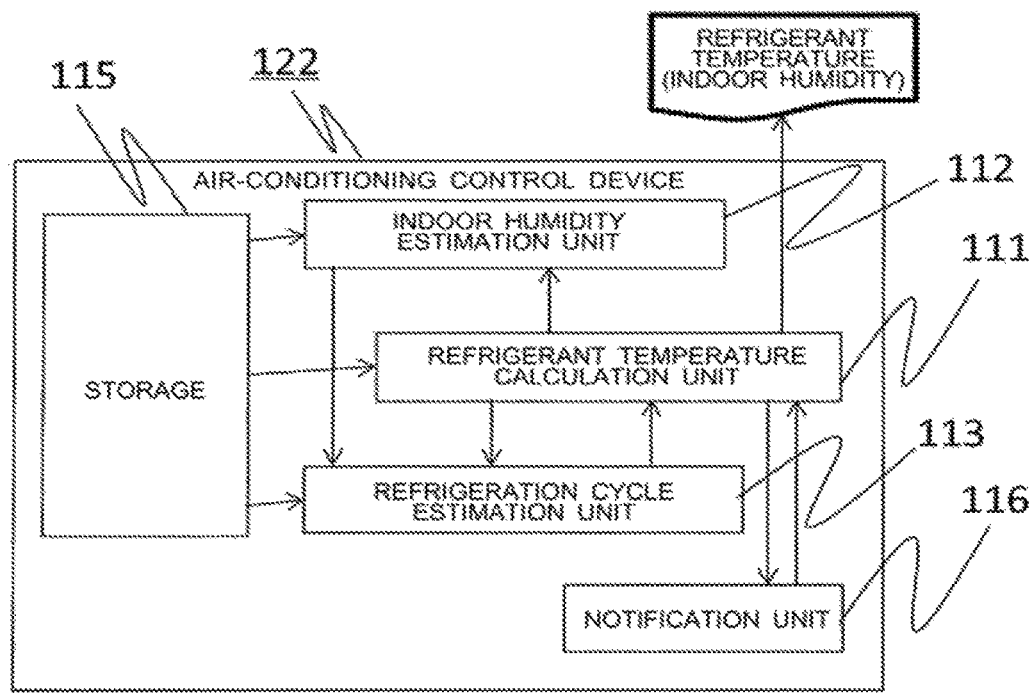
FIG. 18 is a configuration diagram of the air-conditioning control device according to Embodiment 2 of the present invention.

FIGS. 17 and 18 are each a configuration diagram of an air-conditioning control device 122 according to Embodiment 2. Unlike the air-conditioning control device 102 according to Embodiment 1, the air-conditioning control device 122 includes a notification unit 116. In the drawing, components denoted by an identical reference sign are identical or correspond to each other, which applies to the entire description and all drawings in the specification. Furthermore, configurations of components in the entire specification are merely exemplary, and the present invention is not limited to these configurations.

The notification unit 116 receives information of the refrigerant temperature and the indoor humidity from the refrigerant temperature calculation unit 111. The notification unit 116 may also serve as an input unit for changing the set room temperature. When the notification unit 116 is used to change the set room temperature, information of the set room temperature after change is transmitted from the notification unit 116 to the refrigerant temperature calculation unit 111.

Figure 19:
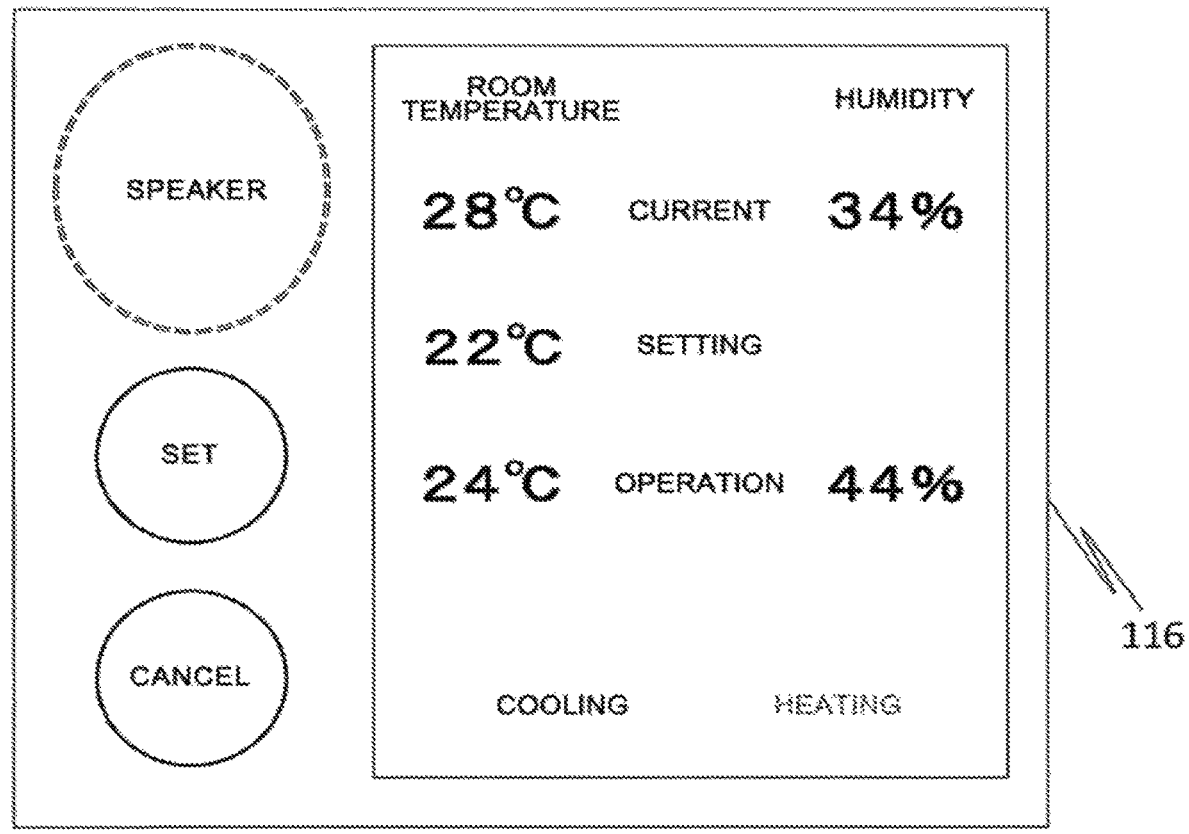
FIG. 19 is a diagram illustrating an exemplary configuration of a notification unit according to Embodiment 2 of the present invention.

FIG. 19 is a diagram illustrating an exemplary configuration of the notification unit 116 according to Embodiment 2. In the exemplary configuration, the room temperature before change, as a current operation value, is 28 degrees C., the humidity is 34%, and the cooling operation is performed. In this state, the user (indoor occupant) sets the set room temperature after change to be 22 degrees C. through an input function. The display of [COOLING] is dark and the display of [HEATING] is light, which indicates the cooling operation. The user (indoor occupant) can set the set room temperature after change to be 22 degrees C. by using a [SET] button, a [CANCEL] button, and other button in accordance with a voice guidance output from a [SPEAKER] as necessary.

In this exemplary configuration, the room temperature is 24 degrees C. and the humidity is 44% for [OPERATION]. This display shows that the user desires a room temperature of 22 degrees C. but a set room temperature closest to the room temperature desired by the user without change of consumed electric power is 24 degrees C. This is because, when the refrigerant temperature calculation unit 111 cannot calculate a refrigerant temperature that achieves consumed electric power that equals the consumed electric power at the current refrigerant temperature (when the consumed electric power that is calculated has not converged to the consumed electric power at the current refrigerant temperature), the refrigerant temperature calculation unit 111 calculates the refrigerant temperature by shifting the set room temperature after change toward the set room temperature before change in stages until the refrigerant temperature is calculated by the refrigerant temperature calculation unit 111.

In this manner, the notification unit 116 displays, on a display screen, the indoor humidity associated with the set room temperature after change, which allows, for example, easy prediction that the humidity decreases to achieve a dried state by increasing the set room temperature at cooling.

In addition to the notification through the screen display, the notification unit 116 may perform voice notification using a speaker or a similar device. For example, voice guidance is performed of which "Operation is performed at a room temperature of 24 degrees C. and a humidity of 44% because a room temperature of 22 degrees C. cannot be set". Consequently, the user Consequently, the user can easily know how the set room temperature is changed even when the set room temperature input by the user is changed.

As the notification unit 116 issue an notification on information of the set room temperature used to calculate the refrigerant temperature by the refrigerant temperature calculation unit 111, the air-conditioning system can be operated at a set room temperature desired by the user or a temperature close to the set room temperature without changing the electric power consumed by the air-conditioning system.

Embodiment 3

Figure 20:
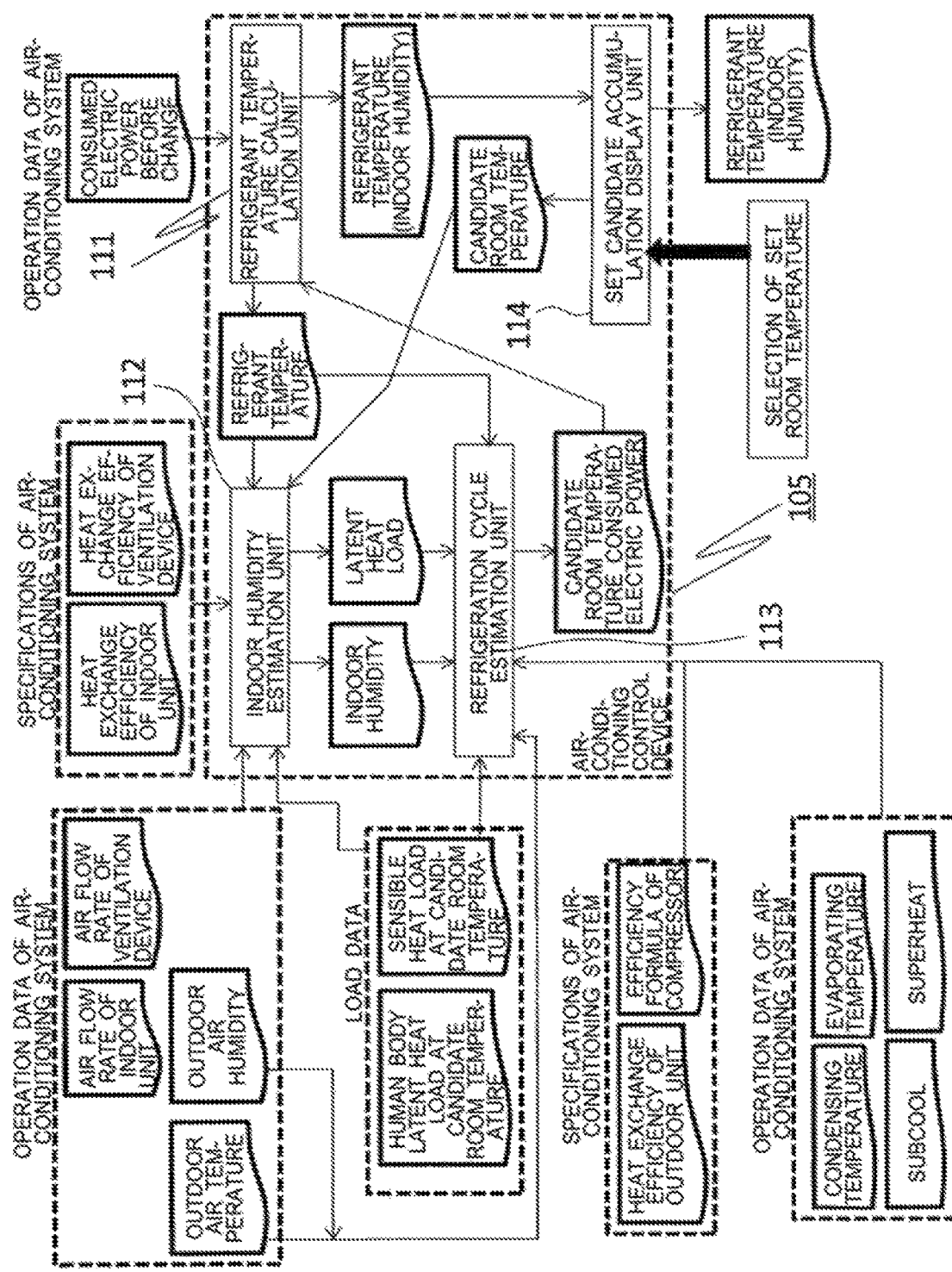
FIG. 20 is a configuration diagram of an air-conditioning control device according to Embodiment 3 of the present invention.
Figure 21:
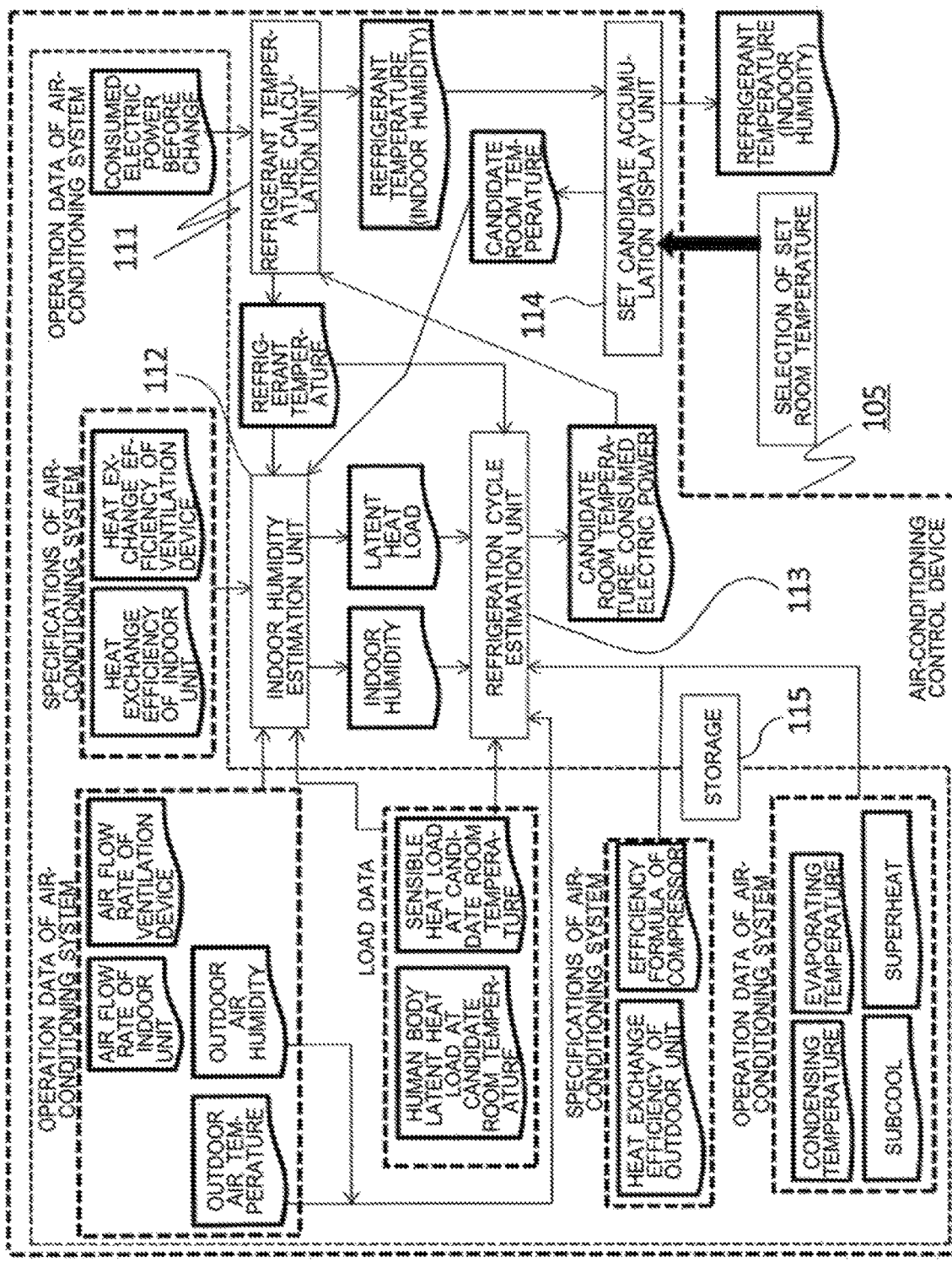
FIG. 21 is a configuration diagram of the air-conditioning control device according to Embodiment 3 of the present invention.

FIGS. 20 and 21 are each a configuration diagram of an air-conditioning control device 105 according to Embodiment 3. Unlike the air-conditioning control device 102 according to Embodiment 1, the air-conditioning control device 105 includes a set candidate accumulation display unit 114. The set candidate accumulation display unit 114 shifts a set candidate room temperature from the current set room temperature in stages and inputs the set candidate room temperature to the indoor humidity estimation unit 112 until the refrigerant temperature calculation unit 111 becomes unable to calculate a refrigerant temperature that achieves consumed electric power at which the agreement is made, in other words, a refrigerant temperature at which estimated consumed electric power equals the electric power consumed by the air-conditioning apparatus 10 at the set room temperature before change (until the consumed electric power that is calculated becomes unable to converge to the consumed electric power at the set room temperature before change). A temperature shifted between stages may be determined as appropriate, and may be shifted by, for example, 0.5 degrees C. or 1.0 degrees C. The consumed electric power at which the agreement is made is not complete agreement but is practical agreement including error depending on the degree of this temperature shift. The set candidate accumulation display unit 114 accumulates the refrigerant temperature at the set candidate room temperature when the consumed electric power determined by the refrigerant temperature calculation unit 111 equals the consumed electric power at the set room temperature before change, and displays a plurality of set candidate room temperatures when the consumed electric power determined by the refrigerant temperature calculation unit 111 equals the consumed electric power at the set room temperature before change.

At each choice of a candidate room temperature, repetitive calculation by the indoor humidity estimation unit 112, the refrigeration cycle estimation unit 113, and the refrigerant temperature calculation unit 111 is performed, and when the consumed electric power that is calculated equals the consumed electric power at the set room temperature before change, the refrigerant temperature and the indoor humidity are obtained by the refrigerant temperature calculation unit 111 and each become a display record at the set candidate accumulation display unit 114. When the refrigerant temperature performed by the consumed electric power at which the agreement is made cannot be calculated by the refrigerant temperature calculation unit 111, the candidate room temperature is determined to be not good. In this manner, the set candidate accumulation display unit 114 accumulates the refrigerant temperature at the set candidate room temperature determined by the refrigerant temperature calculation unit 111, and displays records of the set candidate room temperature and the indoor humidity.

Figure 22:
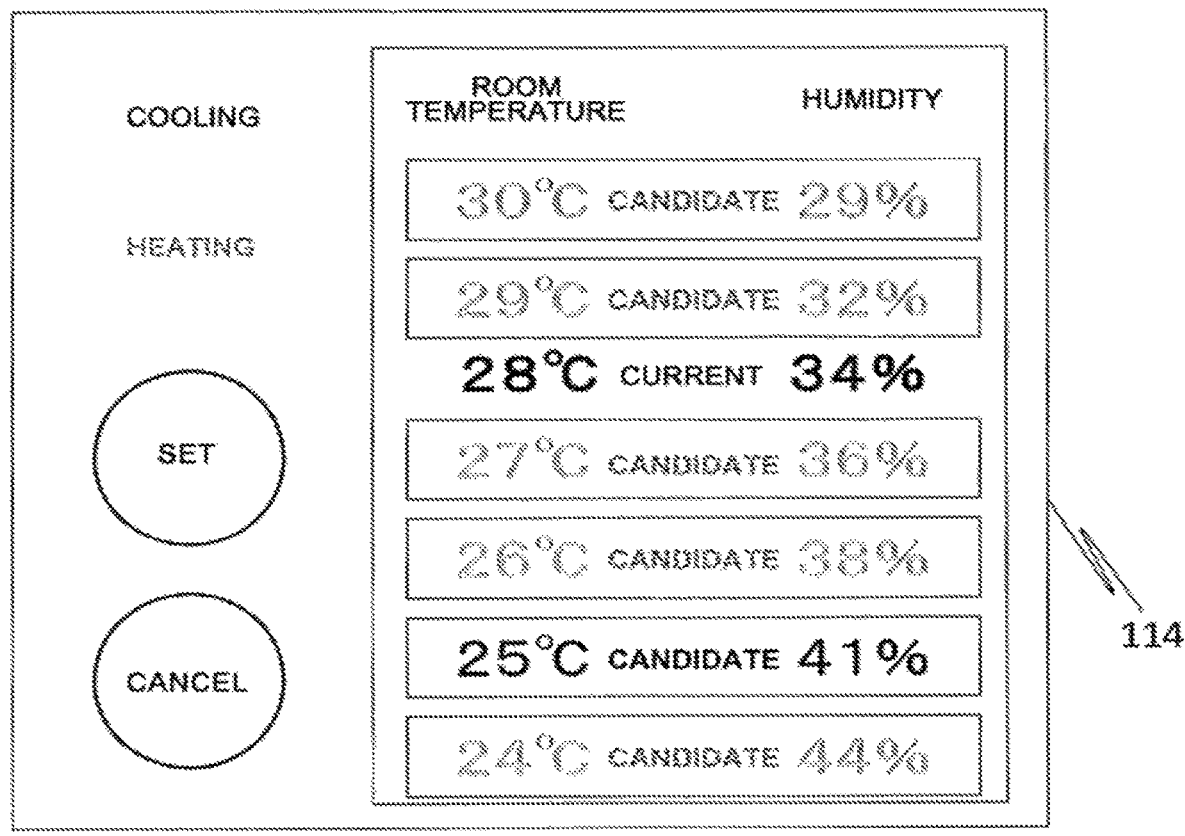
FIG. 22 is a diagram illustrating an exemplary set candidate accumulation display unit according to Embodiment 3 of the present invention.

FIG. 22 is a diagram illustrating an exemplary set candidate accumulation display unit 114 according to Embodiment 3. In this example, the cooling operation is currently performed at a room temperature of 28 degrees C. and a humidity of 34%, and room temperatures as set candidates in stages of 1 degree C. from 24 degrees C. to 30 degrees C. are displayed with associated humidities. The dark display of [COOLING] and the light display of [HEATING] indicate that the cooling operation is being performed. The user can determine a room temperature from among the candidate room temperatures by using a [SET] button, a [CANCEL] button, and other button. In this example, a room temperature of 25 degrees C. and a humidity of 41% are to be selected. In the display of set candidate room temperatures and humidities, only a current room temperature of 28 degrees C. and a current humidity of 34%, and a room temperature of 25 degrees C. and a humidity of 41% among the candidates are displayed dark, and the others are displayed light. In this example, a speaker is omitted, but voice guidance may be used together.

Instead of displaying a table of all selectable pairs of the set candidate room temperature and the indoor humidity, the set candidate accumulation display unit 114 may display a two-dimensional graph with the set candidate room temperature on one of axes and the indoor humidity on the other axis. With this configuration, the user (indoor occupant) can more intuitively determine comfort when the set room temperature is changed, and can pursue an indoor environment in accordance with preference.

In estimation of the refrigerant temperature that causes no change in the electric power consumed by the air-conditioning apparatus 10, when no refrigerant temperature satisfies such a condition, pairs of a set room temperature value at which a refrigerant temperature that causes no change in the electric power consumed by the air-conditioning apparatus 10 is available, and an indoor humidity associated with the value may be displayed to the user, thereby allowing the user to select a set room temperature.

In this manner, the set candidate accumulation display unit 114 includes a selection unit configured to allow the user to select a set room temperature from a combination list of set candidate room temperatures and indoor humidities. Alternatively, a list of set candidate room temperatures without indoor humidities may be displayed depending on preferences of the user. Bold upward arrows in FIGS. 20 and 21 indicate the set room temperature selection by the user.

As described above, the air-conditioning control device includes the indoor humidity estimation unit configured to estimate the indoor humidity and the latent heat load at the set candidate room temperature of the air-conditioning apparatus including a refrigeration cycle when the indoor humidity estimation unit receives at least the set candidate room temperature and the refrigerant temperature as a parameter to be changed, the refrigeration cycle estimation unit configured to estimate consumed electric power at the set candidate room temperature when the refrigeration cycle estimation unit receives at least the outdoor air temperature, the refrigerant temperature received by the indoor humidity estimation unit, and the indoor humidity and the latent heat load estimated by the indoor humidity estimation unit, the refrigerant temperature calculation unit configured to calculate the refrigerant temperature at the set candidate room temperature by repeating the estimation at the indoor humidity estimation unit and the refrigeration cycle estimation unit while changing the refrigerant temperature until the consumed electric power estimated by the refrigeration cycle estimation unit equals electric power consumed by the air-conditioning apparatus at the current set room temperature, and the set candidate accumulation display unit configured to input the set candidate room temperature shifted in stages to the indoor humidity estimation unit until the refrigerant temperature calculation unit becomes unable to calculate the refrigerant temperature that achieves the consumed electric power at which the agreement is made, accumulate the refrigerant temperature at the set candidate room temperature calculated by the refrigerant temperature calculation unit, and display the set candidate room temperature. Consequently, the air-conditioning system can be operated at a set room temperature desired by the user without changing the electric power consumed by the air-conditioning system.

In other words, the air-conditioning control device includes the indoor humidity estimation unit configured to estimate the indoor humidity and the latent heat load at the set candidate room temperature of the air-conditioning apparatus including a refrigeration cycle when the indoor humidity estimation unit receives the set candidate room temperature and the refrigerant temperature as a parameter, the refrigeration cycle estimation unit configured to estimate consumed electric power at the set candidate room temperature when the refrigeration cycle estimation unit receives the outdoor air temperature, the refrigerant temperature, the indoor humidity, and the latent heat load, the refrigerant temperature calculation unit configured to repeat the estimation at the indoor humidity estimation unit and the refrigeration cycle estimation unit while changing the refrigerant temperature and, when the consumed electric power estimated by the refrigeration cycle estimation unit equals electric power consumed by the air-conditioning apparatus at the current set room temperature, calculate the refrigerant temperature when the consumed electric power estimated by the refrigeration cycle estimation unit equals electric power consumed by the air-conditioning apparatus at the current set room temperature, and the set candidate accumulation display unit configured to input the set candidate room temperature shifted in stages by the indoor humidity estimation unit when the consumed electric power estimated by the refrigeration cycle estimation unit does not equal the electric power consumed by the air-conditioning apparatus at the current set room temperature, accumulate the refrigerant temperature at the set candidate room temperature calculated by the refrigerant temperature calculation unit, and display the set candidate room temperature. Consequently, the air-conditioning system can be operated at a set room temperature desired by the user without changing the electric power consumed by the air-conditioning system.

The air-conditioning control method includes an indoor humidity estimation step of estimating the indoor humidity and the latent heat load at the set candidate room temperature of the air-conditioning apparatus including a refrigeration cycle by inputting at least the set candidate room temperature and the refrigerant temperature as a parameter to be changed, a refrigeration cycle estimation step of estimating consumed electric power at the set candidate room temperature by inputting at least the outdoor air temperature, the refrigerant temperature received at the indoor humidity estimation step, and the indoor humidity and the latent heat load estimated at the indoor humidity estimation step, a refrigerant temperature calculation step of calculating the refrigerant temperature at the set candidate room temperature by repeating the estimation at the indoor humidity estimation step and the refrigeration cycle estimation step while changing the refrigerant temperature until the consumed electric power estimated at the refrigeration cycle estimation step equals electric power consumed by the air-conditioning apparatus at the current set room temperature, and a set candidate accumulation display step of inputting the set candidate room temperature shifted in stages to the indoor humidity estimation step until the refrigerant temperature at the consumed electric power at which the agreement is made becomes unable to be calculated at the refrigerant temperature calculation step, accumulating the refrigerant temperature at the set candidate room temperature calculated at the refrigerant temperature calculation step, and displaying the set candidate room temperature. Consequently, the air-conditioning system can be operated at a set room temperature desired by the user without changing the electric power consumed by the air-conditioning system.

The set candidate accumulation display unit includes a selection unit for the set room temperature from a combination list of the set candidate room temperatures and the indoor humidities. Consequently, the air-conditioning system can be operated at a set room temperature desired by the user without changing the electric power consumed by the air-conditioning system.

Embodiment 4

Figure 23:
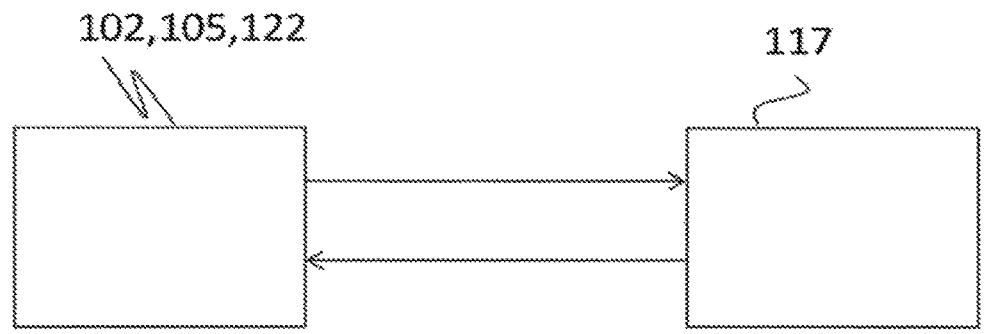
FIG. 23 is a diagram illustrating an exemplary air-conditioning control device according to Embodiment 4 of the present invention.

FIG. 23 is a diagram illustrating an exemplary air-conditioning control device according to Embodiment 4. In the drawing, the left block represents any one of the air-conditioning control devices 102, 105, and 122 according to Embodiments 1 to 3. The right block represents a slave device 117 of the air-conditioning control device 102, 105, or 122 according to Embodiment 1, 2, or 3.

The slave device 117 can communicate information with any one of the air-conditioning control devices 102, 105, and 122 according to Embodiments 1 to 3 in a wireless manner such as infrared communication. At least set room temperature change can be transferred from the slave device 117 to the air-conditioning control device 102, 105, or 122 serving as the master device of the slave device 117.

The air-conditioning control device 102, 105, or 122 serving as the master device has all functions of the air-conditioning control device 102, 105, or 122, and the slave device 117 may have some or all of the functions of the air-conditioning control device 102, 105, or 122. The slave device 117 may be a dedicated portable terminal or an application on a cellular phone (smartphone).

As described above, the air-conditioning control device is divided into the master device and the slave device, and the set room temperature can be changed from the slave device. Consequently, the air-conditioning system can be operated at a set room temperature desired by the user without changing the electric power consumed by the air-conditioning system.

REFERENCE SIGNS LIST 2 compressor 3 expansion valve 4 indoor heat exchanger 5 indoor fan 6 outdoor heat exchanger 7 outdoor fan 10 air-conditioning apparatus 11 indoor unit 12 outdoor unit 13 ventilation device 14 window 15 wall 16 office automation apparatus 17 illumination apparatus 18 person 19 temperature and humidity sensor 20 electric power meter 21 room occupancy sensor 101 indoor space 101a perimeter 101b interior 102, 105, 122 air-conditioning control device 103 refrigerant pipe 104 transmission line 111 refrigerant temperature calculation unit 112 indoor humidity estimation unit 113 refrigeration cycle estimation unit 114 set candidate accumulation display unit 115 storage 116 notification unit 117 slave device 131 air supply fan 132 air discharge fan 133 total heat exchanger

The invention claimed is:

1. An air-conditioning control device, comprising:

an indoor humidity estimation unit configured to estimate an indoor humidity and a latent heat load at a second set room temperature of an air-conditioning apparatus including a refrigeration cycle when a first set room temperature is changed to the second set room temperature and the indoor humidity estimation unit receives the second set room temperature and a refrigerant temperature as a parameter of the refrigeration cycle;

a refrigeration cycle estimation unit configured to estimate consumed electric power at the second set room temperature when the refrigeration cycle estimation unit receives an outdoor air temperature, the refrigerant temperature, the indoor humidity, and the latent heat load; and a refrigerant temperature calculation unit configured to change the refrigerant temperature to cause the indoor humidity estimation unit to repeat an estimation of the indoor humidity and the latent heat load and the refrigeration cycle estimation unit to repeat an estimation of the consumed electric power, when the consumed electric power at the second set room temperature estimated by the refrigeration cycle estimation unit equals electric power consumed by the air-conditioning apparatus at the first set room temperature, the refrigerant temperature calculation unit being configured to calculate the refrigerant temperature with which the consumed electric power at the second set room temperature is estimated and command the air-conditioning apparatus for the refrigerant temperature.

2. The air-conditioning control device of claim 1, wherein, when the consumed electric power at the second set room temperature estimated by the refrigeration cycle estimation unit does not equal the electric power consumed by the air-conditioning apparatus at the first set room temperature, the refrigerant temperature calculation unit is configured to calculate the refrigerant temperature with which consumed electric power at a third set room temperature is estimated by shifting the second set room temperature toward the first set room temperature in stages until the third set room temperature is reached and causing the consumed electric power at the third set room temperature estimated by the refrigeration cycle estimation unit to equal the electric power consumed by the air-conditioning apparatus at the first set room temperature.

3. The air-conditioning control device of claim 2, further comprising a notification unit configured to issue a notification on information of the third set room temperature used when the refrigerant temperature is calculated by the refrigerant temperature calculation unit.

4. The air-conditioning control device of claim 3, wherein the air-conditioning control device is configured to display the indoor humidity associated with the third set room temperature.

5. The air-conditioning control device of claim 1, wherein the air-conditioning control device is configured to display the indoor humidity associated with the second set room temperature.

6. The air-conditioning control device of claim 1, wherein the air-conditioning control device is divided into a master device and a slave device, and the second set room temperature is changed through the slave device.

7. An air-conditioning control device, comprising:

an indoor humidity estimation unit configured to estimate an indoor humidity and a latent heat load at a set candidate room temperature of an air-conditioning apparatus including a refrigeration cycle when the indoor humidity estimation unit receives the set candidate room temperature and a refrigerant temperature as a parameter of the refrigeration cycle;

a refrigeration cycle estimation unit configured to estimate consumed electric power at the set candidate room temperature when the refrigeration cycle estimation unit receives an outdoor air temperature, the refrigerant temperature, the indoor humidity, and the latent heat load;

a refrigerant temperature calculation unit configured to change the refrigerant temperature to cause the indoor humidity estimation unit to repeat an estimation of the indoor humidity and the latent heat load and the refrigeration cycle estimation unit to repeat an estimation of the consumed electric power and calculate the refrigerant temperature that equals the set candidate room temperature when the consumed electric power at the set candidate room temperature estimated by the refrigeration cycle estimation unit equals electric power consumed by the air-conditioning apparatus at a current set room temperature; and a set candidate accumulation display unit configured to accumulate the refrigerant temperature at the set candidate room temperature when the consumed electric power calculated by the refrigerant temperature calculation unit equals the electric power consumed by the air-conditioning apparatus at the current set room temperature, and display the set candidate room temperature when the consumed electric power calculated by the refrigerant temperature calculation unit equals the electric power consumed by the air-conditioning apparatus at the current set room temperature.

8. The air-conditioning control device of claim 7, wherein the set candidate accumulation display unit includes a selection unit configured to select a set room temperature from a list of combinations between the set candidate room temperature and the indoor humidity.

9. An air-conditioning control method, comprising:

an indoor humidity estimation step of estimating an indoor humidity and a latent heat load at a second set room temperature of an air-conditioning apparatus including a refrigeration cycle by changing a first set room temperature to the second set room temperature and inputting the second set room temperature and a refrigerant temperature as a parameter of the refrigeration cycle;

a refrigeration cycle estimation step of estimating consumed electric power at the second set room temperature by inputting an outdoor air temperature, the refrigerant temperature, the indoor humidity, and the latent heat load; and a refrigerant temperature calculation step of changing the refrigerant temperature to cause the indoor humidity estimation step to repeat an estimation of the indoor humidity and the latent heat load and the refrigeration cycle estimation step to repeat an estimation of the consumed electric power, and when the consumed electric power at the second set room temperature estimated at the refrigeration cycle estimation step equals electric power consumed by the air-conditioning apparatus at the first set room temperature, calculating the refrigerant temperature with which the consumed electric power at the second set room temperature is estimated and commanding the air-conditioning apparatus for the refrigerant temperature.

* * * * *